United States Patent
Egloff et al.

(10) Patent No.: US 9,746,078 B2
(45) Date of Patent: Aug. 29, 2017

(54) FLAT GASKET

(75) Inventors: Georg Egloff, Oberh./Weissenhorn (DE); Kurt Hoehe, Langenau (DE); Armin Guetermann, Leipheim (DE); Matthias Pendzialek, Ulm (DE)

(73) Assignee: REINZ-Dichtungs-GmbH, Neu-Ulm (DE)

( * ) Notice: Subject to any disclaimer, the term of this patent is extended or adjusted under 35 U.S.C. 154(b) by 428 days.

(21) Appl. No.: 13/261,798

(22) PCT Filed: Jul. 20, 2012

(86) PCT No.: PCT/EP2012/064308
§ 371 (c)(1),
(2), (4) Date: Mar. 21, 2014

(87) PCT Pub. No.: WO2013/011132
PCT Pub. Date: Jan. 24, 2013

(65) Prior Publication Data
US 2014/0217678 A1    Aug. 7, 2014

(30) Foreign Application Priority Data

Jul. 20, 2011 (DE) .................. 20 2011 103 420
Feb. 16, 2012 (DE) .................. 10 2012 003 149

(51) Int. Cl.
F16J 15/08    (2006.01)
F16H 61/00    (2006.01)
F15B 13/08    (2006.01)

(52) U.S. Cl.
CPC ......... *F16J 15/0818* (2013.01); *F15B 13/081* (2013.01); *F16H 61/0009* (2013.01); *F16J 15/0825* (2013.01); *F16J 15/0831* (2013.01); *Y10T 29/49908* (2015.01)

(58) Field of Classification Search
CPC ................. F16J 15/0818; F16J 15/0825; F16J 2015/085; F16J 15/0831; F15B 13/081; F16H 61/0009; Y10T 29/49908
See application file for complete search history.

(56) References Cited

U.S. PATENT DOCUMENTS

| | | | | |
|---|---|---|---|---|
| 4,728,110 A | * | 3/1988 | Nakasone | F16J 15/0825 277/595 |
| 4,834,399 A | * | 5/1989 | Udagawa | F16J 15/0825 277/592 |
| 5,084,324 A | * | 1/1992 | Schirmer | B29C 51/008 428/137 |

(Continued)

FOREIGN PATENT DOCUMENTS

| DE | 10053556 A1 | 5/2002 |
|---|---|---|
| DE | 102008062829 A1 | 7/2010 |

(Continued)

*Primary Examiner* — Kristina Fulton
*Assistant Examiner* — Eugene G Byrd
(74) *Attorney, Agent, or Firm* — Marshall & Melhorn, LLC

(57) ABSTRACT

The invention relates to a flat seal such as those that are used in motor vehicle construction in particular. Such flat seals can be used for example as seals in the exhaust tract of internal combustion engines, as cylinder head gaskets, or also as hydraulic system control plates. Hydraulic system control plates, such as transmission control plates for example, always have a sealing function in addition to a fluid control function simultaneously.

10 Claims, 32 Drawing Sheets

(56) References Cited

U.S. PATENT DOCUMENTS

Figure 1:
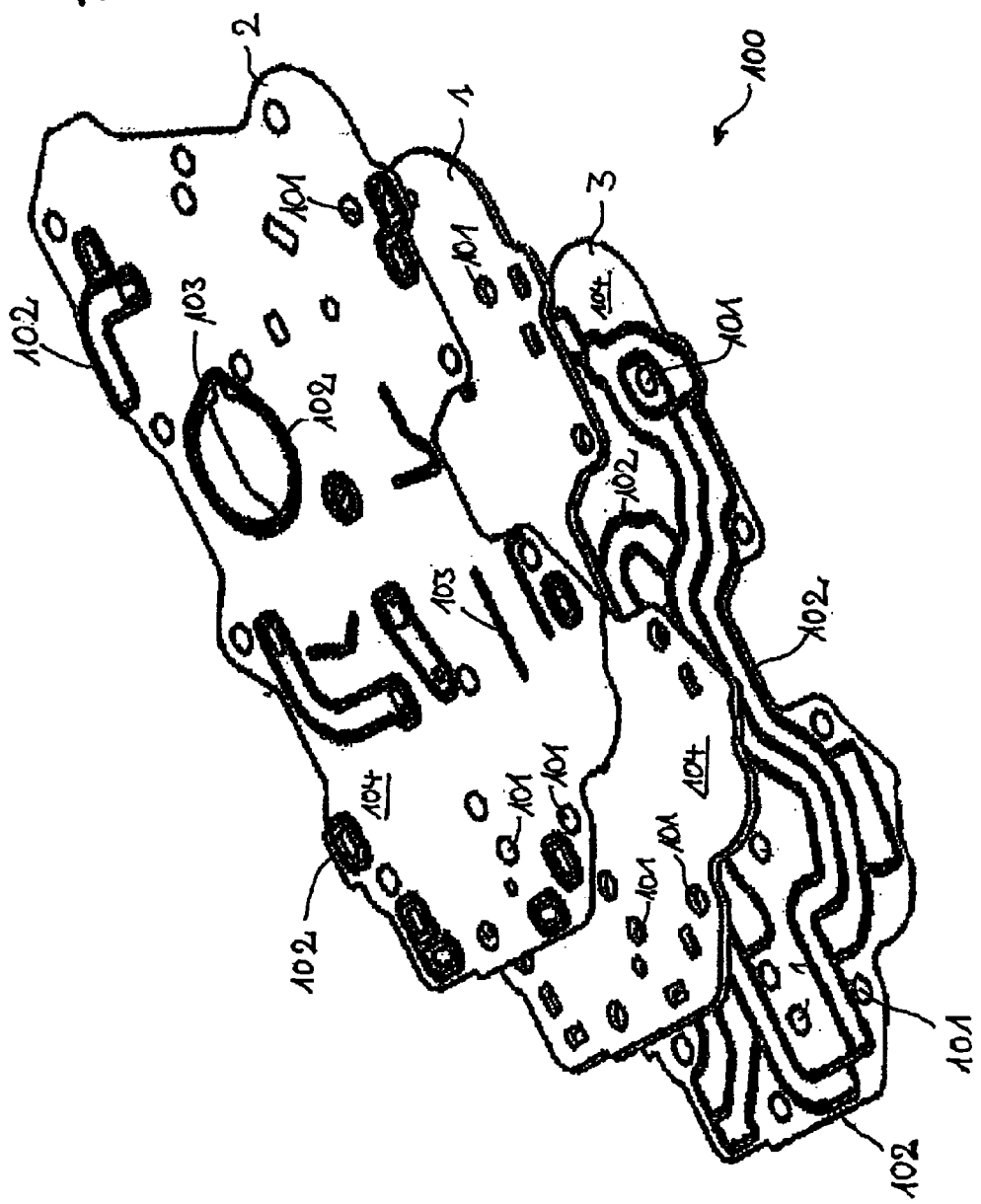

| | | | | |
|---|---|---|---|---|
| 5,582,415 A | | 12/1996 | Yoshida et al. | |
| 6,179,298 B1 | * | 1/2001 | Schweiger | F16J 15/0831 |
| | | | | 24/618 |
| 6,283,480 B1 | * | 9/2001 | Miura | F16J 15/0825 |
| | | | | 277/593 |
| 6,948,714 B1 | * | 9/2005 | Quick | F16J 15/0818 |
| | | | | 277/592 |
| 7,059,610 B2 | * | 6/2006 | Hegmann | F16J 15/0831 |
| | | | | 277/598 |
| 2008/0136119 A1 | * | 6/2008 | Imai | F16J 15/0831 |
| | | | | 277/593 |
| 2009/0311551 A1 | * | 12/2009 | Ueta | B21D 39/035 |
| | | | | 428/603 |

FOREIGN PATENT DOCUMENTS

| | | |
|---|---|---|
| DE | 102009008019 B3 | 11/2010 |
| DE | 102009031208 A1 | 1/2011 |
| EP | 2270366 A2 | 1/2011 |
| WO | 2010072402 A1 | 7/2010 |

* cited by examiner

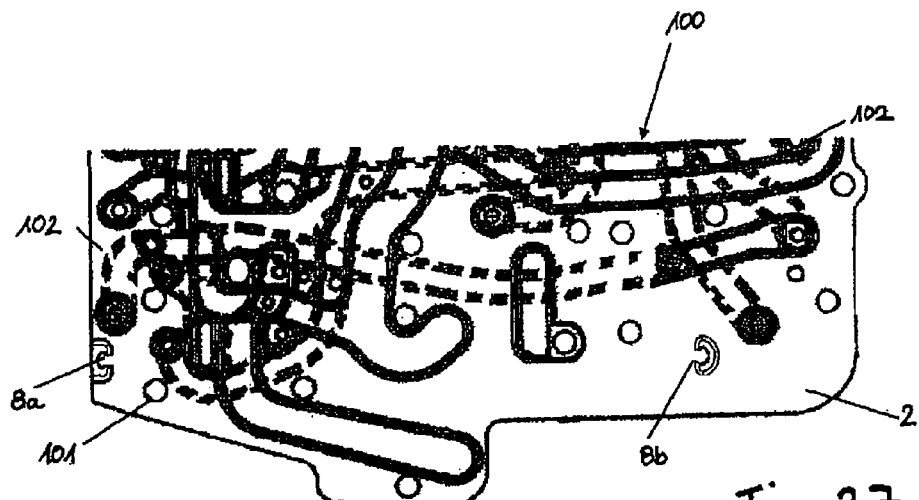
Fig. 27
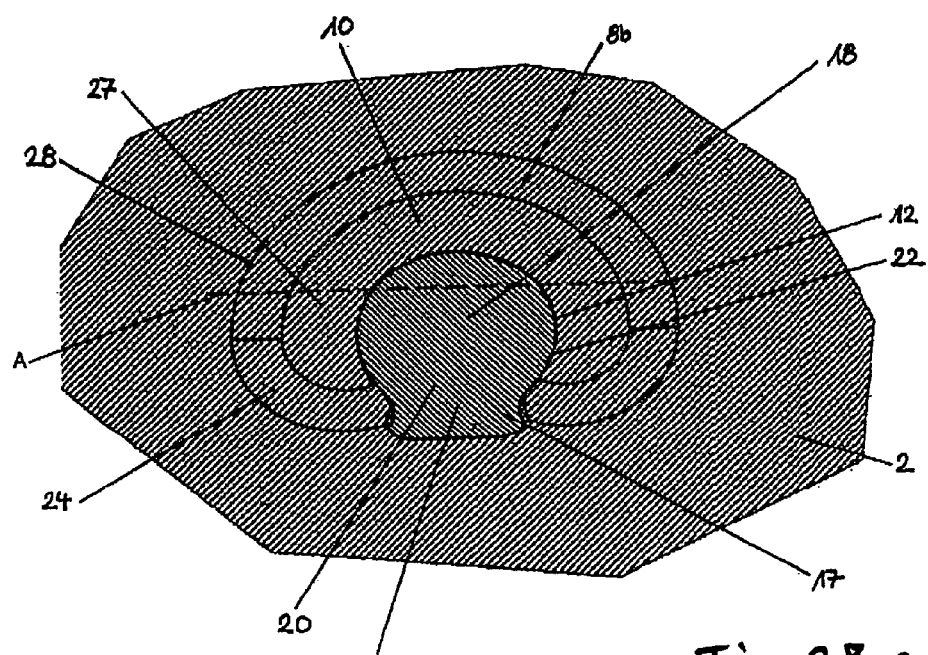
Fig. 28-a

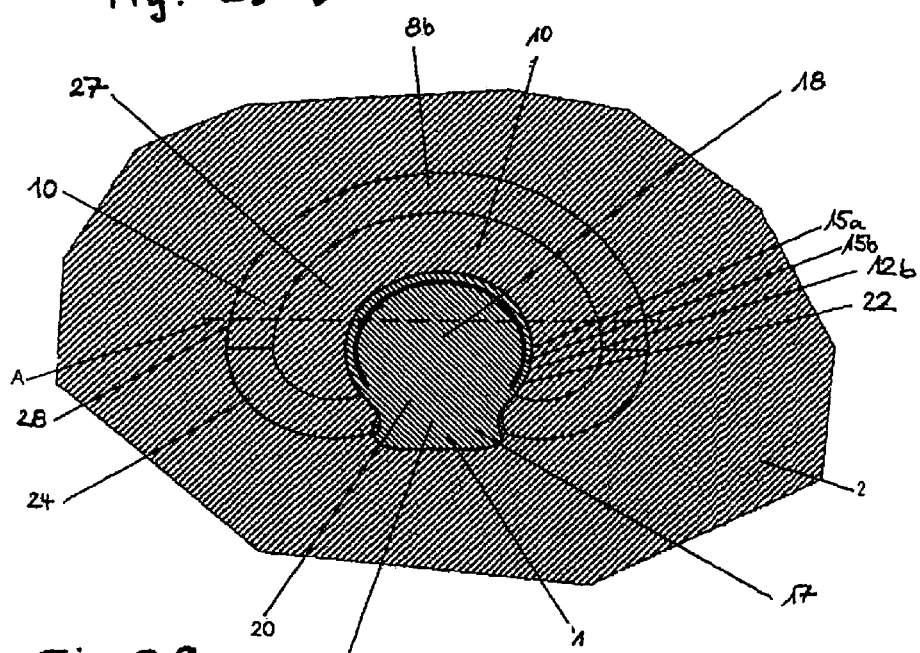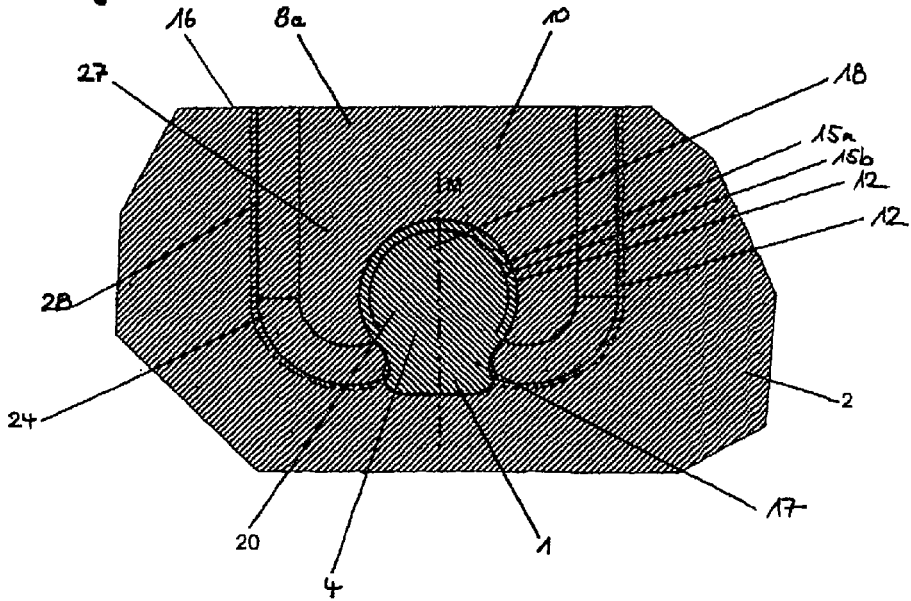

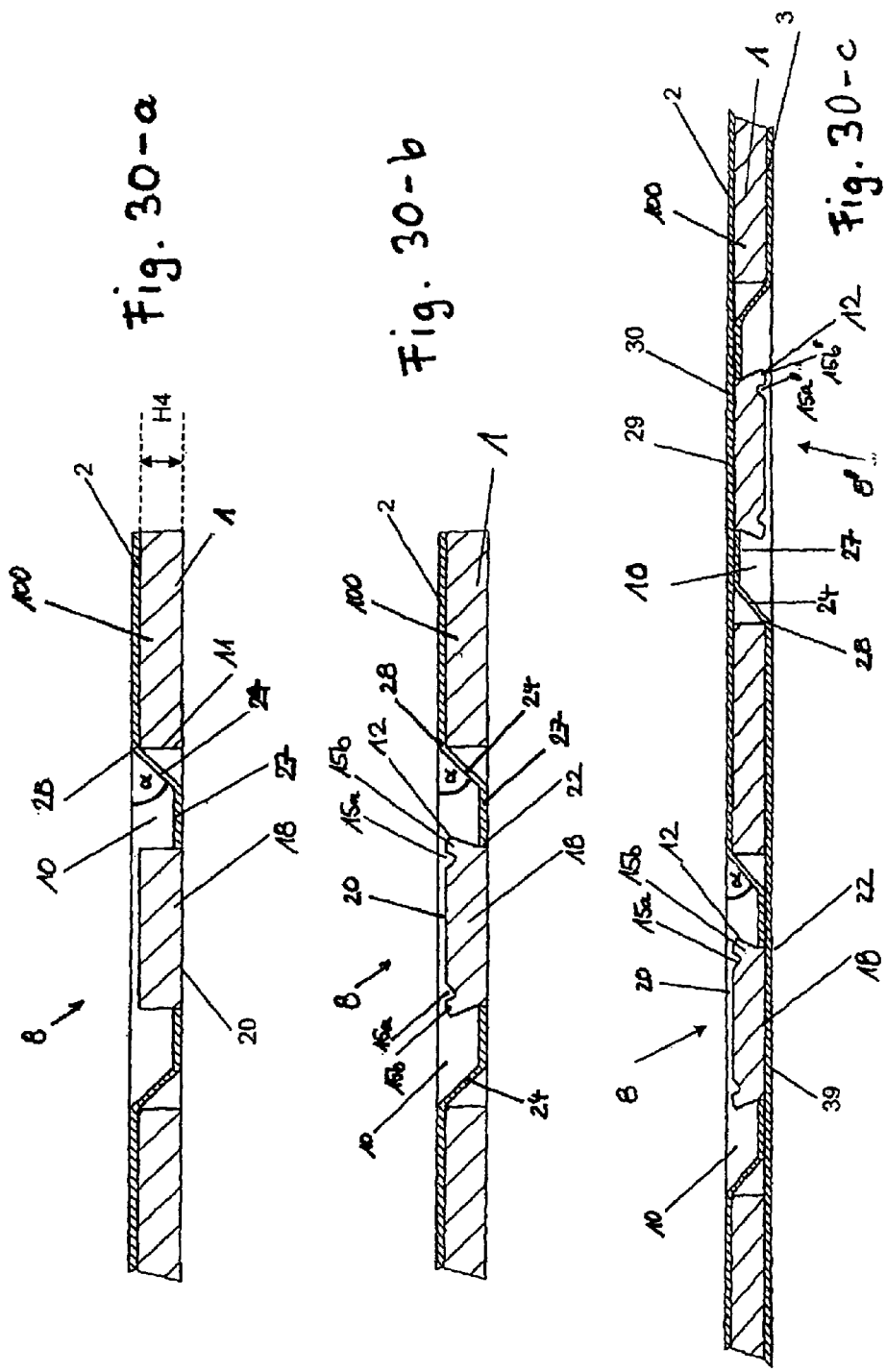

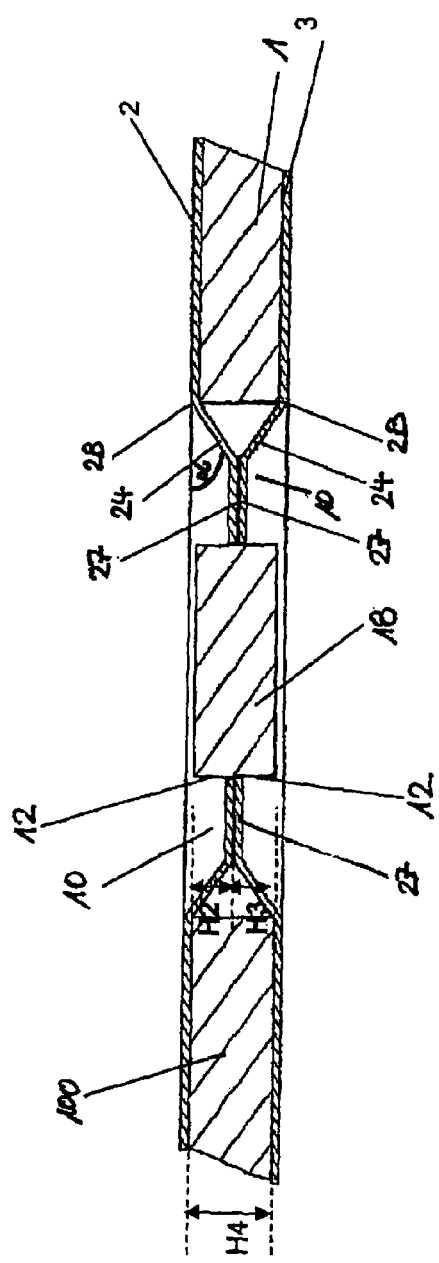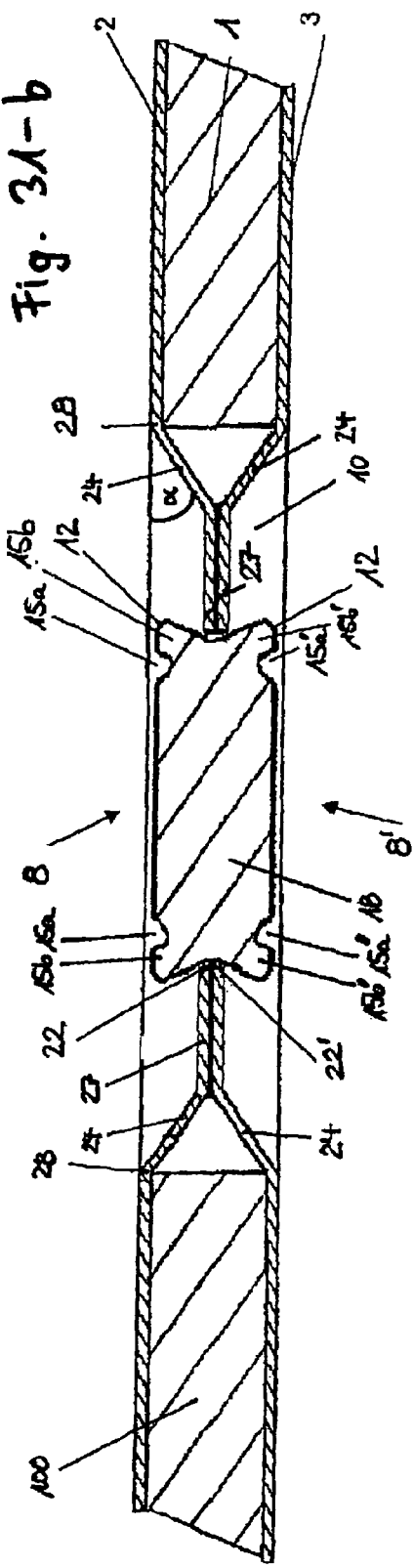

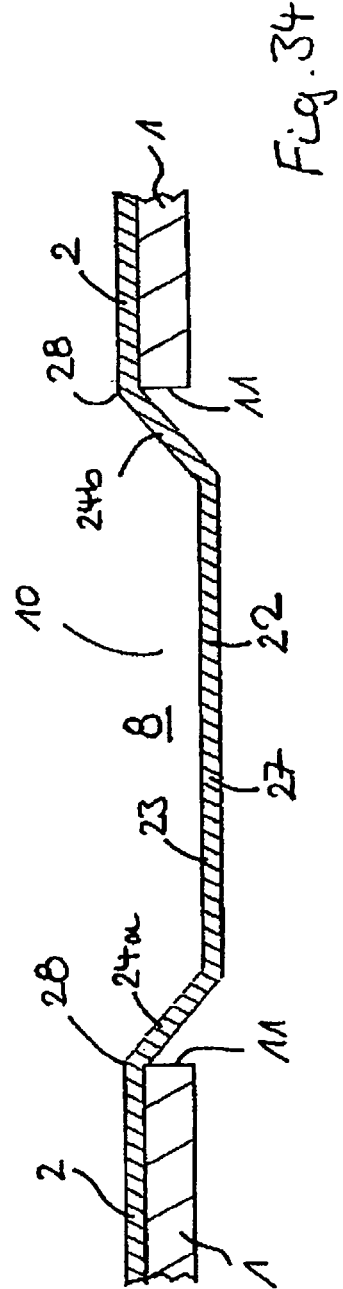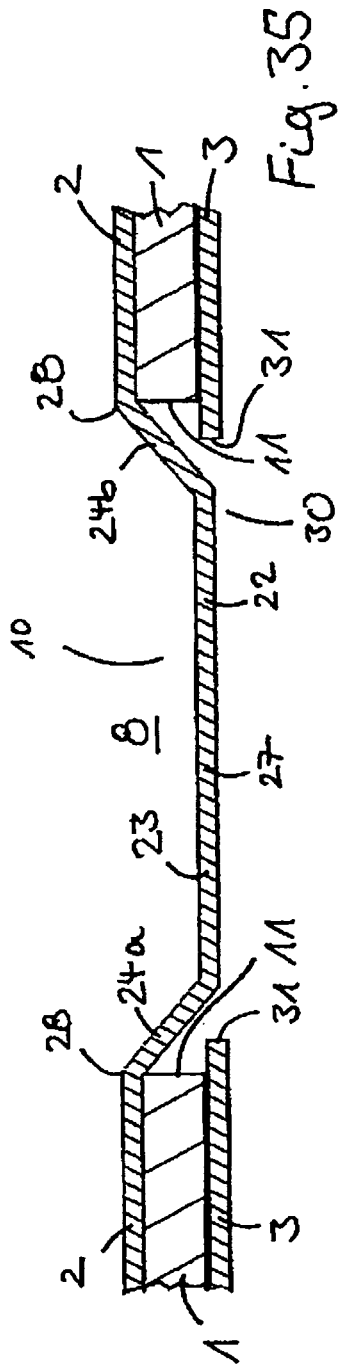

FLAT GASKET

BACKGROUND OF THE INVENTION

The present invention relates to a flat gasket as it is in particular used in vehicles. Such flat gaskets are for instance applied as gaskets in the exhaust line of combustion engines, as cylinder head gaskets or also as control plates for hydraulic systems. Control plates for hydraulic systems, such as transmission control plates in addition to the fluid control function simultaneously have a sealing function.

Flat gaskets often show a multi-layered construction. The first layer that is used is usually a distance layer, which due to its predetermined thickness establishes a particular distance between the two parts interconnected through the flat gasket. As a further layer, a first gasket layer can be found on top of this first distance layer, which may for instance comprise sealing elements such as beads or coatings. Such gasket layers provide for the actual sealing between the parts interconnected through the flat gasket and in the following are referred to as sealing layers. Further layers may be added.

With such multi-layered flat gaskets, it is required that the individual layers are connected to each other at least for their transport until the final installation, so that a flat gasket can be handled as a unit. To this end, the layers are conventionally welded or riveted to each other or connected with one another by folding over of the edges of the layers.

These conventional connection techniques show a plurality of disadvantages. Practice has shown that a layer interconnection via welding points always also causes welding sputter, which gets loose after the installation of the flat gasket and which may lead to a blocking of passage openings in the flat gasket or in the adjacent parts. Moreover, welding methods can only be applied for gasket layers which are not coated.

Interconnection of two gasket layers using a rivet in the area of the rivet causes a thickening or a local protrusion of the rivet over the gasket layers. Further, riveting always causes formation of chips, these chips can be carried on to the passage openings of the flat gasket or also of an adjacent part. Finally, a rivet connection requires the use of additional parts, namely the rivets, and additional connection steps.

Folding over of the edges for the interconnection of neighboring gasket layers requires a purposeful design of the outer edge of the neighboring layers, either by steps, by an inclined course, by deliberate recesses or the like. This increases the effort for the production of the tooling. In addition, the gasket layers this way can only be connected to each other at their outer edges. Folding over, too, causes a thickening of the flat gasket in the area with the folded-over edge.

This is also the case if the layers are connected to each other by clinching. This also applies for the related method of tox clinching.

BRIEF SUMMARY OF THE INVENTION

It is therefore the object of the present invention to provide for a multi-layered flat gasket, in which the individual gasket layers are connected to each other without thickening and without impurities, such as chips or abrasion, in a sufficient manner. It is further the object of the present invention to provide for a method for the connection of the layers of a multi-layered gasket, which can be realized in a simple and cost-efficient way using simple and cost-efficient tools and which neither leads to a thickening nor to a contamination of the flat gasket but nevertheless provides for a sufficient connection between the individual gasket layers.

This object is solved by a flat gasket to the claims. In the respectively dependent claims, advantageous embodiments of a flat gasket according to the invention as well as of the method according to the invention are given.

Here, gaskets in the exhaust line as well as cylinder head gaskets of a combustion engine shall be mentioned as examples for a flat gasket according to the invention. A further example for a flat gasket according to the invention is a control plate for a hydraulic system, in particular a transmission control plate, e.g. for a transmission of a vehicle. In all these cases, a flat gasket is produced with the connection method according to the invention, in which at least two of the layers are sufficiently connected to each other during their transport until the final mounting of the flat gasket.

According to the invention, the flat gasket comprises at least a first and a second metallic layer. As a first layer, e.g. a distance layer may be provided, while a bottom layer can be arranged below the distance layer or a top layer may be arranged on top of the distance layer as the second layer. Such bottom or top layers can be designed as sealing layers. They then comprise sealing elements, such as elastomeric coatings or sealing beads.

These two metallic layers, possibly also further metallic layers, are connected to each other according to the invention through at least one connection portion.

To this end, the first layer comprises one border and the second layer shows at least one free edge adjacent to this border, thus above or below this border. The free edge of the second layer is cranked in such a manner that it extends at least in sections adjacent to the border within the layer thickness of the first layer. As an alternative, the free edge can also be cranked in such a pronounced way that the side of the first layer (1) pointing away from the second layer (2) at least in sections, in sections or completely extends outside of the layer thickness of the first layer (1). In other words, the free edge of the second layer is cranked in such a way that it extends at least in sections within the second layer or on the other side of the second layer which other side points away from the first layer.

Now, the border of the first layer is designed in such a manner that the free edge overlaps the second layer in the area of the free edge from above or below and this way holds the second layer with positive connection. An overlap from both sides is possible if the free edge extends within the first layer. If the free edge completely or in part extends outside of the first layer, thus if the cranking of the second layer passes through the first layer in order to form the free edge, then the first layer can overlap the free edge only from one side in the plane of the first layer, but this way prevents a detachment of the second layer from the first layer.

Such a connection portion can for instance be produced in such a way that the free edge is first cranked using a forming method and that subsequently, the border of the first layer is then pressed in in such a manner that material of the border of the first layer is flowing above and/or below the free edge so that it reaches over the edge above and/or below the free edge. With this reaching over, a positive fit in one direction is produced if the overlap takes place above or below the free edge. If the reaching over takes place both above and below the free edge, a complete positive fit in an orthogonal direction to the plane of the layer is achieved. When the second layer is cranked in such a way that the free edge is situated within the thickness of the first layer, a positive fit within the plane of the layer is simultaneously achieved.

With such a connection portion, a sufficient transport securing of the plurality of layers of a flat gasket can be produced. It is advantageous that with such a connection according to the invention, no abrasion or chip formation occurs, so that contaminations are avoided and the cleanliness claims posed to the flat gaskets according to the invention can be fulfilled.

Further, the connection method according to the invention prevents from local thickenings in the area of the connection portion, so that the connection portions may also be located in the compression area of the flat gasket. This is among others a consequence of the inventive stamping geometry within the plane of the first layer.

It is further advantageous that no additional connection element such as a rivet is required. As a consequence, the connection method is simplified and more cost efficient.

The connection portion according to the invention requires only little space and can also be miniaturized. It can not only be used in the inner area of the layers, but also at their outer edges. This variable positioning makes it possible to interconnect the layers in an optimal and cost-efficient manner.

Compared to welding, the connection technique according to the invention is not limited to non-coated or partially coated gasket layers, but it is possible with coated layers, too.

The connection method according to the invention is further distinguished by a very simple tool geometry. All holes required for the connection method according to the invention can be punched together with the remaining holes. It is possible to perform all forming steps, thus the cranking of the free edge of the second layer and the compression of the border of the first layer in several steps. It is however also possible to use a very simple tool for this, which realizes both steps of the connection procedure, so that only one working step is required.

As the layers do not need to be additionally pretreated for the connection method according to the invention, all connection steps of the connection method can be realized during the actual connection of the layers.

The method according to the invention enables a connection through an individual point, where with a two-sided overlap of the border of the first layer over the free edge of the second layer, a positive fit from both sides is realized or with an only one-sided overlap a positive fit in one direction is established. In the latter case, it is possible, if required, to achieve a complete connection of the layers and securing of the layers against relative shifts, through a plurality of connection portions.

The method according to the invention does not require any inner mechanics of the embossment tool and by itself is direction-independent within the plane. Due to its simple design, it is suited for a fast transition from prototype to series.

In a particularly advantageous embodiment, the second layer comprises a bridge, the outer edges of which at least in sections extend as free edges adjacent to the border of the first layer. If the first layer additionally comprises a passage, the circumference of which is formed as the above-mentioned border of the first layer, then the bridge of the second layer can be cranked in a suitable manner and be overlapped from both outer edges by the border of the passage of the first layer.

The geometry of the bridge allows for an arbitrary variability. Advantageously, the bridge shows a straight, curved, round, cornered, oval or other form. The bridge advantageously is formed symmetrically to its longitudinal axis and/or to its transverse axis or can also be formed rotationally symmetric around its middle or to another position of the bridge. Such symmetric bridges and symmetric connection portions allow for a particularly simple design of the tool, a particularly simple handling and further for a direction-independent connection of the individual layers.

Advantageously, flat gaskets with more than two gasket layers, e.g. with a distance layer, a cover sheet, a bottom sheet, the last two mentioned ones e.g. formed as sealing layers, and possibly also a sieve layer, e.g. a metallic woven layer, can be formed with the inventive method, too. The distance layer may also consist in several metal sheets. The sieve aims on retaining contaminations.

In this case it is possible to connect two neighboring layers pair-wise with a connection portion according to the invention, so that finally, a compound of interconnected metallic layers of the flat gasket results. The connecting portions may also extend through more than two layers, thus the free edge of one layer may for instance pass, or to be more precise, be cranked through the passage in one or several adjacent layers and be overlapped by the border of a further layer arranged behind these passage-comprising layers.

It is also possible that several adjacent gasket layers or gasket layers opposing each other comprise a free edge, which are cranked in such a manner that they jointly are overlapped by the border of a further gasket layer.

If several connection portions are provided for various combinations of gasket layers these connection portions can be arranged one above the other in a direction orthogonal to the plane of the layers, as they cause no thickening of the layers.

It is however also possible to arrange the connection portions in different gasket layers in such a way that they are shifted to each other in the plane of the layer. In a projection of the planes, in which the different connection portions are situated, to a common plane, the connection portions then do not lie at the same position. Therefore, it is possible to design a flat gasket comprised of several gasket layers in a fluid tight manner with respect to a direction orthogonal to the gasket plane, as the connection portions only allow for a passage of fluids through the layers connected to each other, with at least one further gasket layer being located adjacent to the connection portion, which adjacent to the connection portion shows not passage and therefore ascertains the tightness orthogonal to the plane of gasket of the entire flat gasket. For an optimal interconnection of the layers, it is preferred if the connection portions of a second layer with the first layer, e.g. the distance layer, are most regularly spread over the flat gasket and show both a distance to each other and to the outer edge of the flat gasket.

It is however also possible to arrange one or several connection portions close to the outer edge of the flat gasket. Doing so, it can be preferred to cut-out the second layer not only in the area bordering immediately to the connection portion, but to prolong the recess further to a virtually extending outer edge line, so that the edge of the second layer according to the invention represents a part of the outer edge of the second layer.

With the flat gasket according to the invention, it is preferred if both the first layer, e.g. a distance layer, and the second layer, e.g. a sealing layer, consist in a steel sheet, in particular a sheet of carbon steel or stainless steel or comprise these materials. In this respect, for sealing layers, one usually uses a material with a higher tensile strength than for distance layers. However, it depends on the individual application whether the sealing layers are produced from a spring-hard steel or a non-spring hard steel. For distance layers, a steel with a tensile strength of <900 N/mm$^2$, preferably <700 N/mm$^2$, is usually used.

For an optimal sealing, it is preferred if at least one of the gasket layers on at least one of its surfaces at least in the area of embossed sealing elements is coated. Usually, at least the surface of at least one sealing layer pointing towards a distance layer is coated at least in the area of the embossed sealing elements and in the immediately adjoining area over a width of about one to two times the width of the embossed sealing element.

As coatings, especially such coatings are particularly suited which comprise one or several of the following materials or consist in one or several of the following materials: FPM (vinylidene fluoride-hexafluoropropylene copolymer), Silicon rubber or NBR rubber (acryl-butadiene rubber), PUR (polyurethane), NR (natural rubber), FFKM (perfluoro-elastomer), SBR (styrene-butadiene rubber), BR (polybutadiene), FVMQ (fluorosilicone rubber), CSM (chlorosulfonated polyethylene), silicon and/or epoxy resin. Usually, the coating here is not directly applied to the metallic surface of the gasket layers. Instead, for an improvement of the adhesion of the coating on the metallic surface, a primer layer is applied prior to the application of the actual coating.

With respect to an application even at high pressures, it is advantageous, if the flat gasket according to the invention comprises exactly two sealing layers in addition to one distance layer. In this case, the distance layer is arranged between the two sealing layers. The first sealing elements embossed into the first sealing layer and the second sealing elements embossed into the second sealing layer then on the surface of the respective sealing layer pointing away from the distance layer form sealing lines, thus limitations between the flow channels of a hydraulic liquid in the adjacent parts. Such sealing elements are preferably beads formed into the sealing layer, in particular U-shaped full beads and Z-shaped half beads. The thick distance layer decouples the beads in the respective sealing layers.

With respect to the use of material, it is advantageous if the flat gasket according to the invention, e.g. a control plate for a hydraulic system, comprises exactly one sealing layer in addition to a distance layer. Here, it is also possible to provide for flow channels for hydraulic liquids on both sides of the distance layer, e.g. by sealing elements being applied to the surface of the distance layer which points away from the sealing layer, in particular elastomeric or thermoset-based polymer lines.

Such a distance layer advantageously shows a larger thickness than the adjacent sealing layers. Preferably, the thickness of the distance layer corresponds at least to the double, preferably to the triple, most preferably at least the four-fold of the thickness of an adjacent sealing layer. It is particularly preferred if the distance layer shows a thickness of at least 1 mm.

According to the invention, a free edge of a second gasket layer, which is arranged adjacent to the first layer, is cranked. As a consequence, the gasket layer advantageously shows a section which protrudes from the plane of the second gasket layer, which extends with an acute flank angle—the flank angle α in FIG. 5—between 10° and 60°, preferably between 10° and 40°, further preferably between 15° and 30° or further preferably between 10° and 25°, further preferably between 15° and 20° to the plane of the gasket layer. This angulated area is followed by an area which again extends parallel to the plane of the second gasket layer, so that the edge of this latter area as a whole is cranked with respect to the plane of the second gasket layer.

With this, it is ascertained that in the connected state of the individual gasket layers, the cranking of the second layer reaches into the area of the border of the first gasket layer in such a manner, that it does not protrude beyond the surface of the first gasket layer pointing away from this gasket layer.

The connection portion according to the invention advantageously shows an extension of 2 to 10 mm, preferably of 3.5 to 7.5 mm in the direction of its largest extension. It is preferred if each gasket layer is connected to the adjacent gasket layer through more than one connection portion. If the layer interconnection is realized on both edges of a bridge, this is considered as one connection portion only. For a particularly stable connection, the orientation of the free edge of the second gasket layer and of the border of the first gasket layer is not parallel to the corresponding edges of the second connection portion, but with an angle relative to them. If one uses for instance three connection portions, it is preferred if the edges here extend under an angle of about 120° between the free edges of the individual connection portions. With four connection portions, the free edges of the connection portions advantageously run under an angle of about 90° to each other. In general an angle between the individual free edges of the individual connection portions of about 360°/n is particularly preferred with n connection portions. Deviations by, e.g. 10 to 20° are possible without difficulty, e.g. if other arrangements are not possible for reasons of space. On the other hand, it can also be preferred to arrange the connection portions in parallel in order to equilibrate the tolerance of beads.

In one embodiment of the present invention, the first layer, in particular a distance layer, shows an arc-shaped recess in the area of the connection portion. The arc-shaped recess here results from a corner-free head or stamp continuing from the first layer via a linking bridge. The border of the corner-free head here serves as the border of the first layer, which overlaps the free edge of the second layer, e.g. a sealing layer.

Such an embodiment represents a connection according to the invention. Advantageously, the first layer, in particular the distance layer, does however not show such an arc-shaped recess, the arc-shape of which resulting from a corner-free head or stamp protruding from the first layer via a linking bridge.

In the following, some examples according to the invention for a flat gasket according to the present invention and a production method for this are given. The individual characteristics of the respective example may not only be realized together with all other characteristics of the respective example, but as an individual characteristic can also represent an individual embodiment of the present invention, without realizing the other characteristics of the example comprised in claim 1. In the following, identical or similar reference numbers are used for identical or similar elements, so that their illustration in part is not repeated. Some of the drawings are shown with a frame line, which has however no meaning for the invention.

BRIEF DESCRIPITON OF THE DRAWINGS

It is shown in

Figure 2:
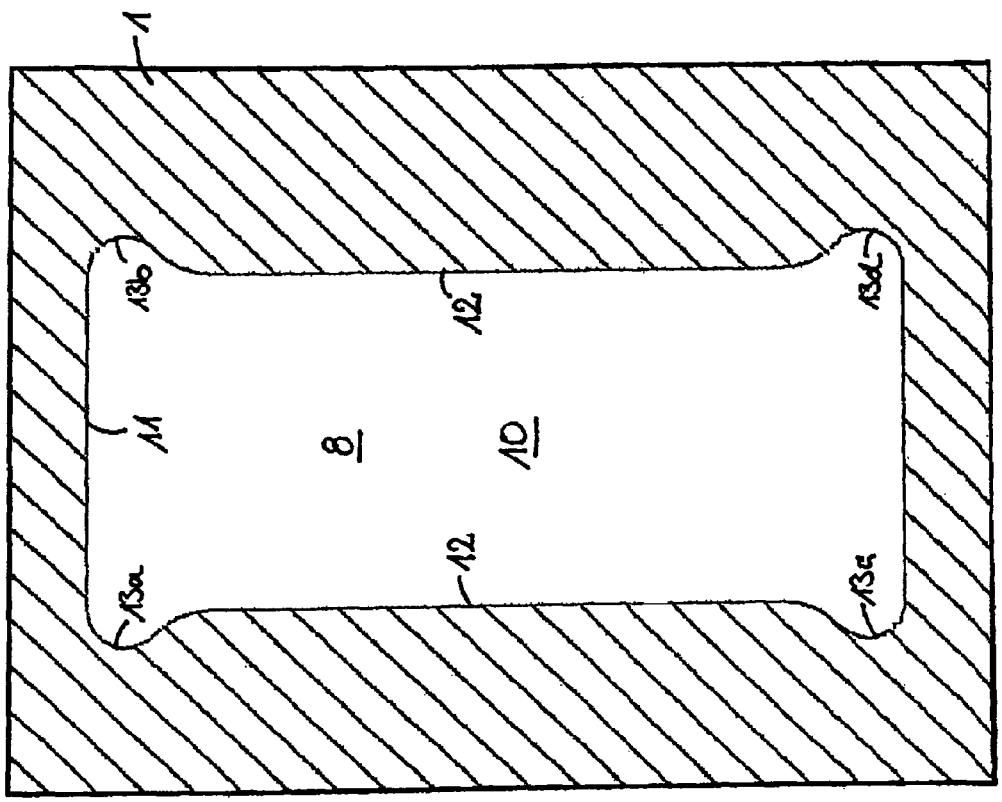
Figure 3:
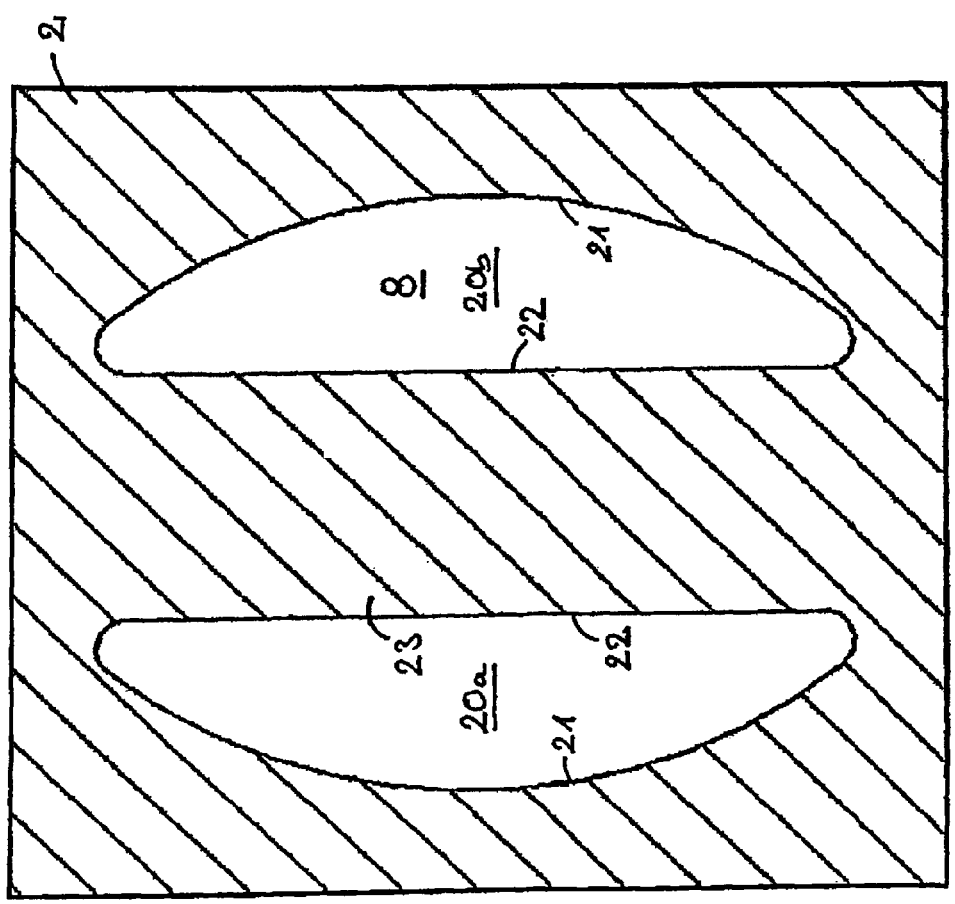
Figure 4:
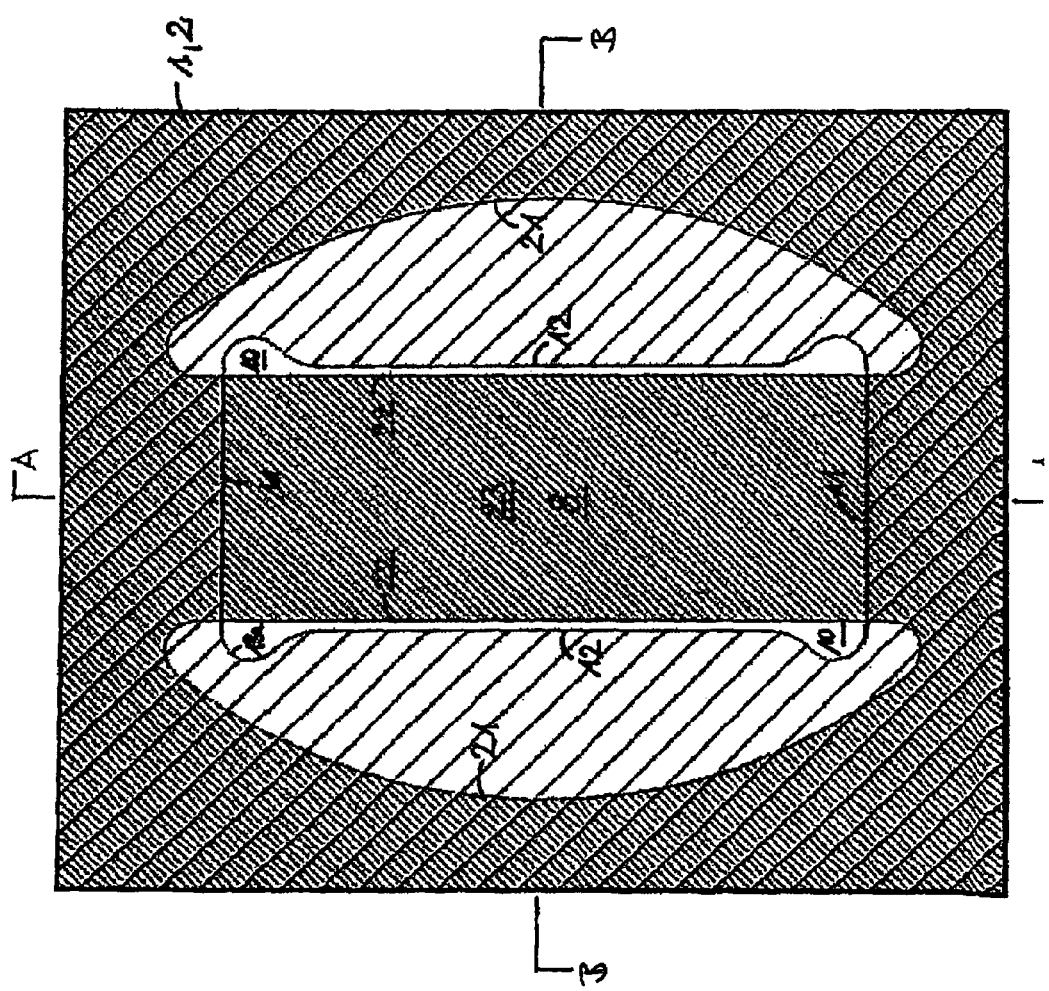
Figure 5:
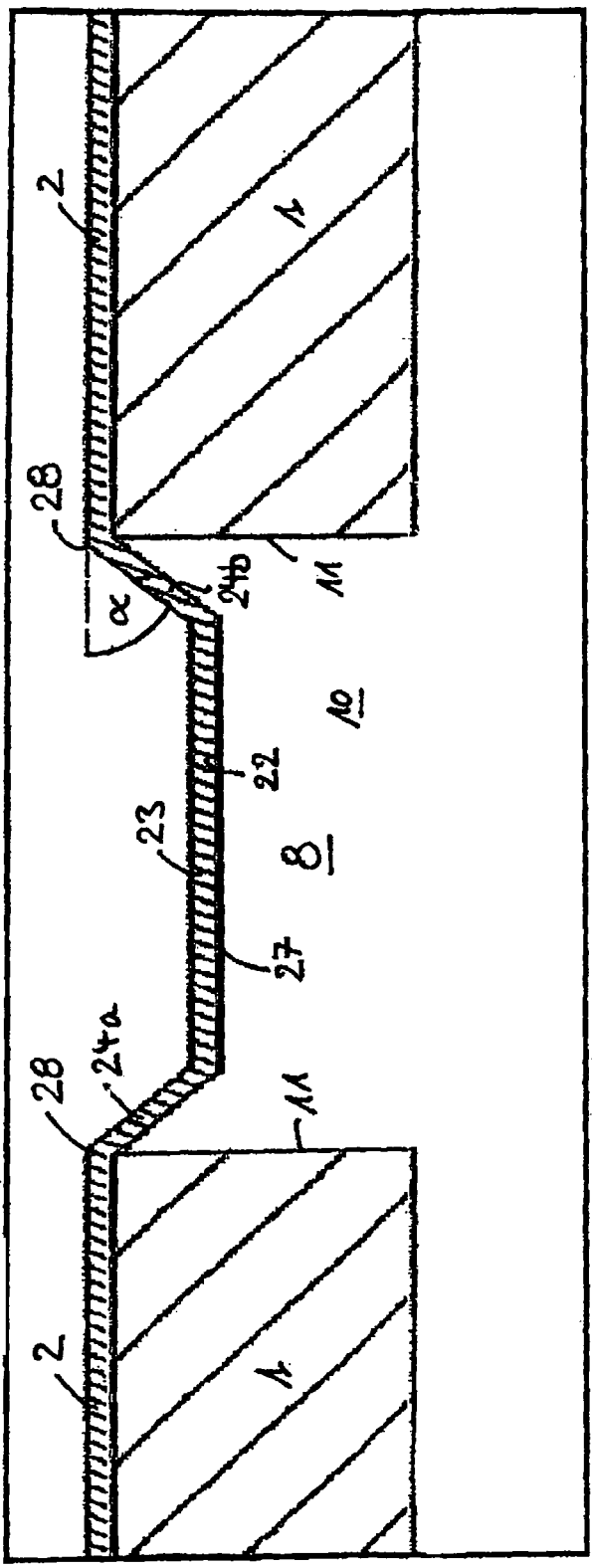
Figure 6:
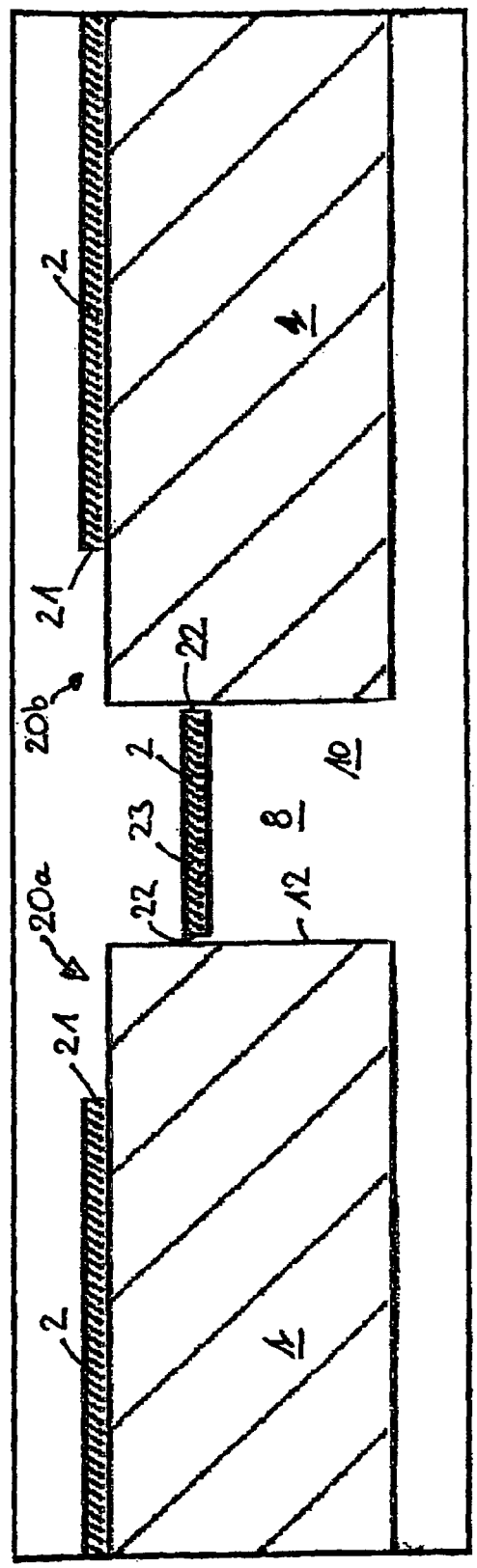
Figure 7:
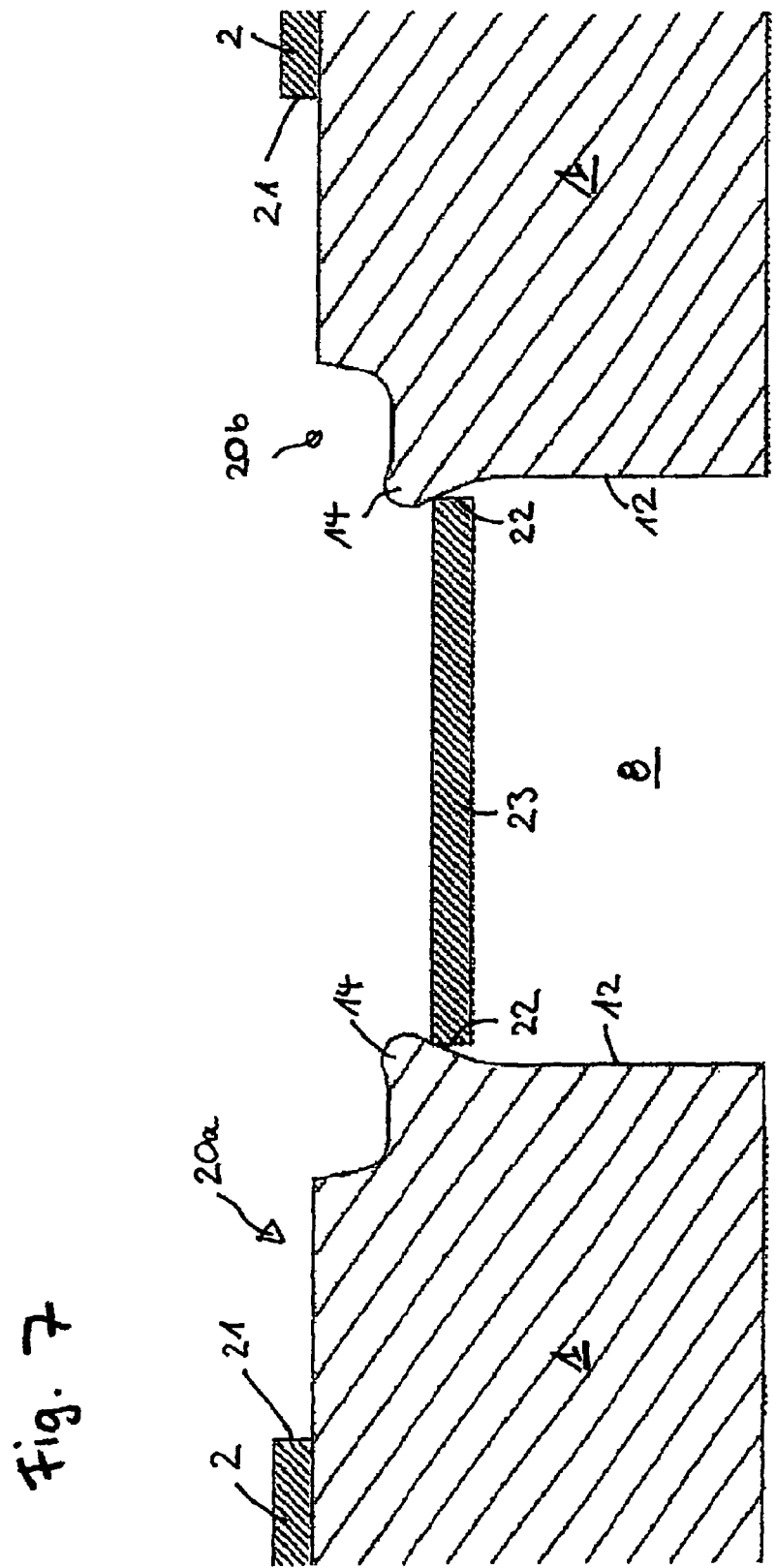
Figure 8:
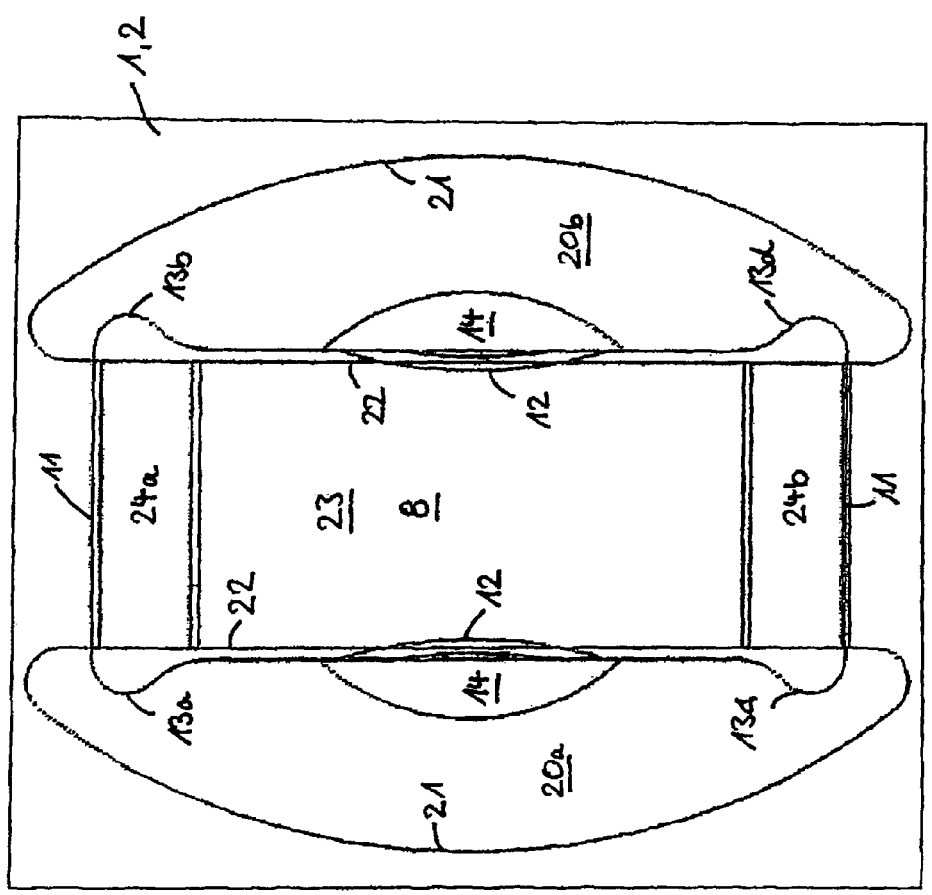
Figure 9:
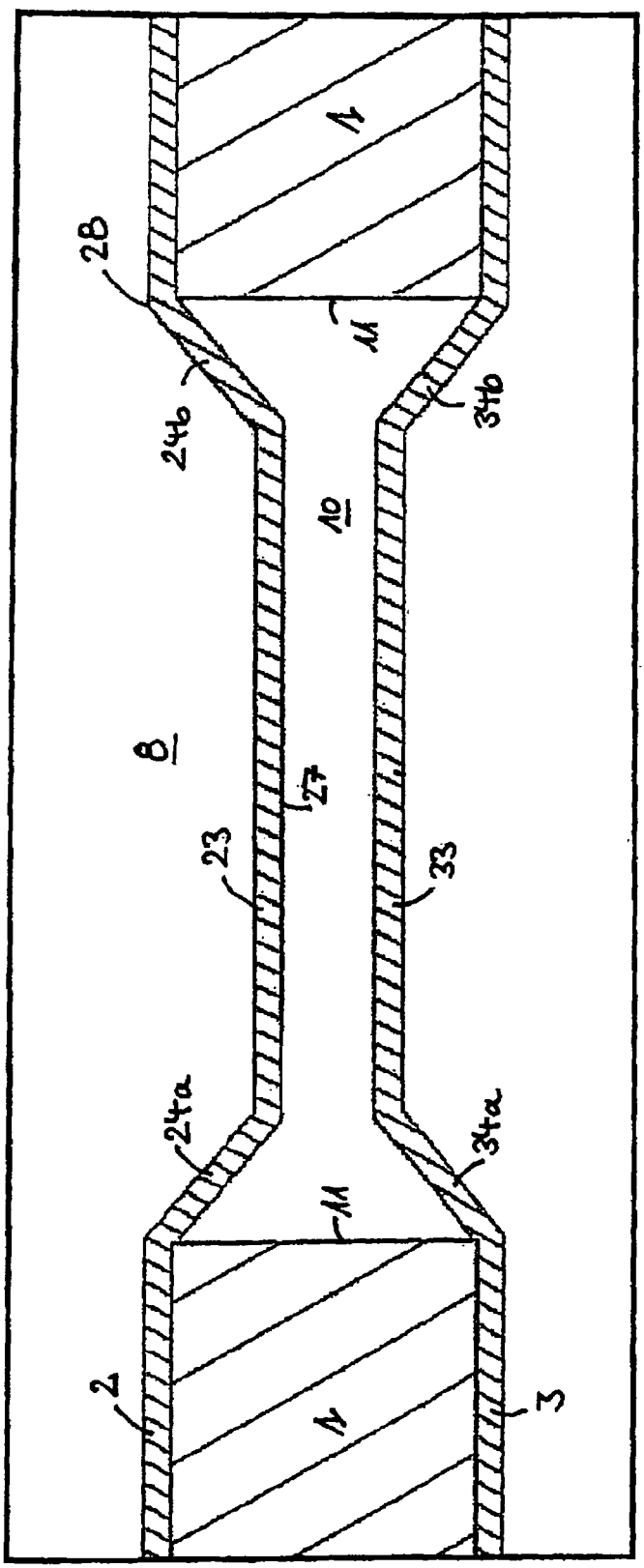
Figure 10:
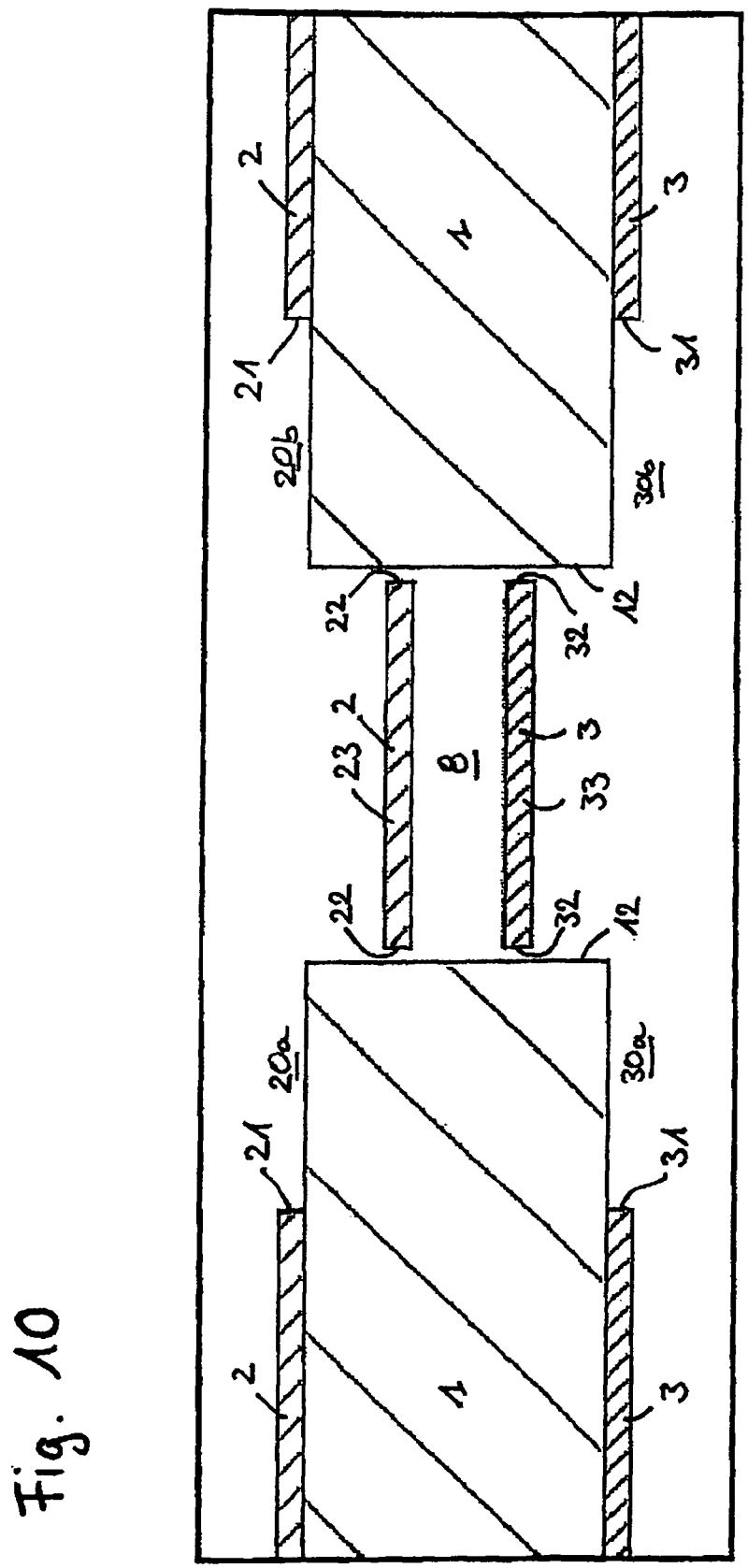
Figure 11:
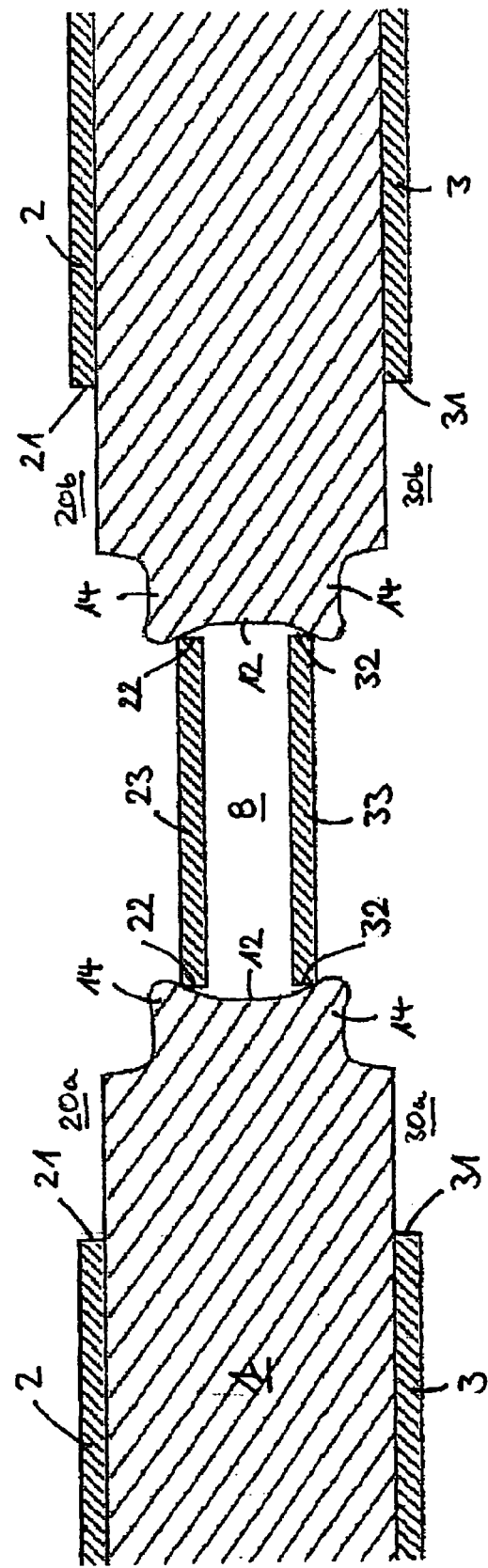
Figure 12:
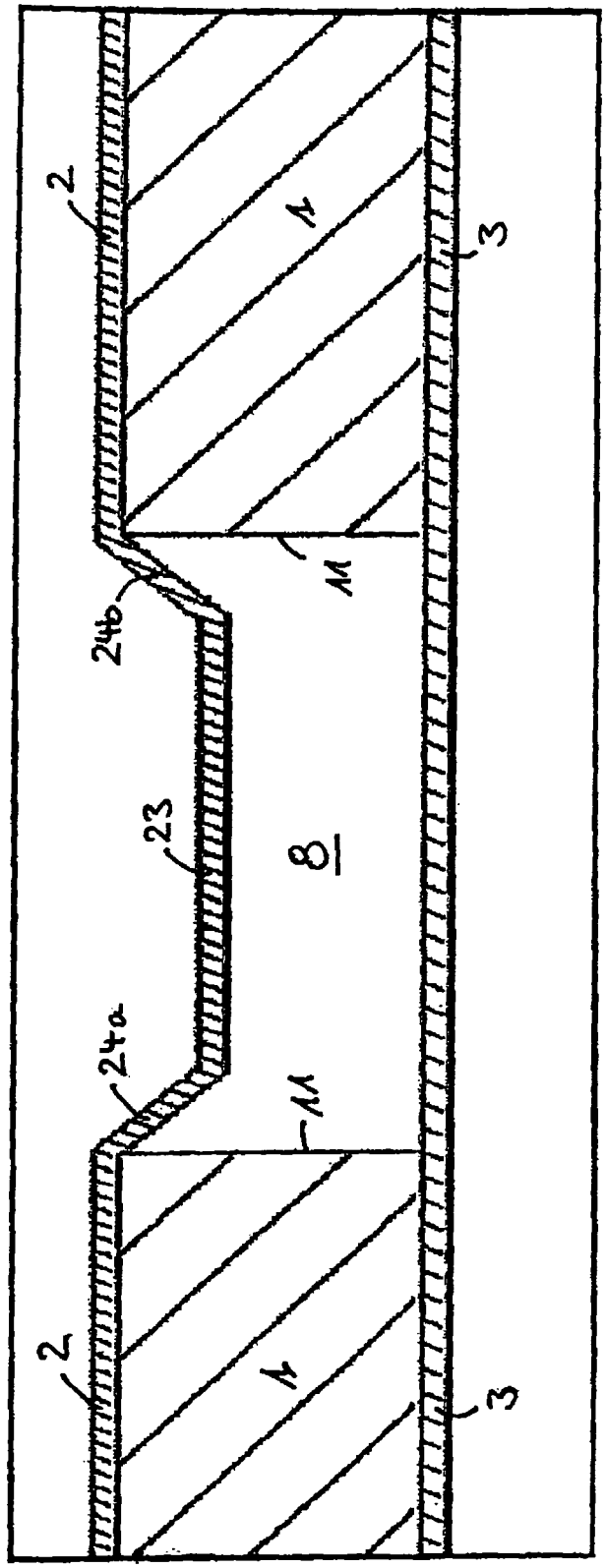
Figure 13:
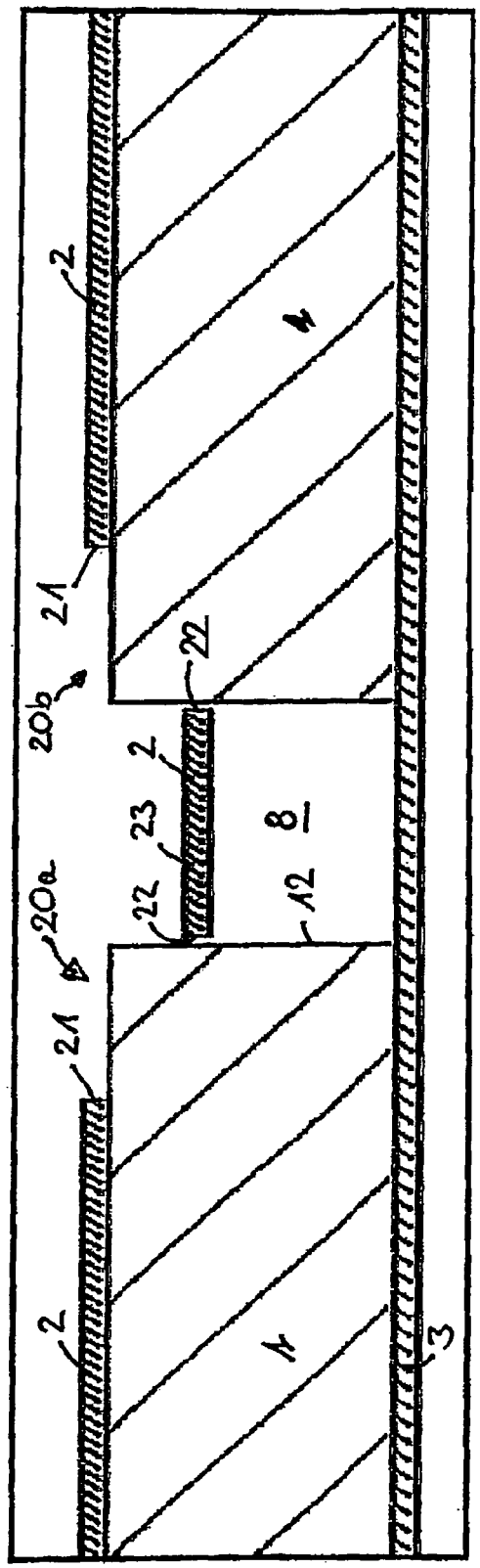
Figure 14:
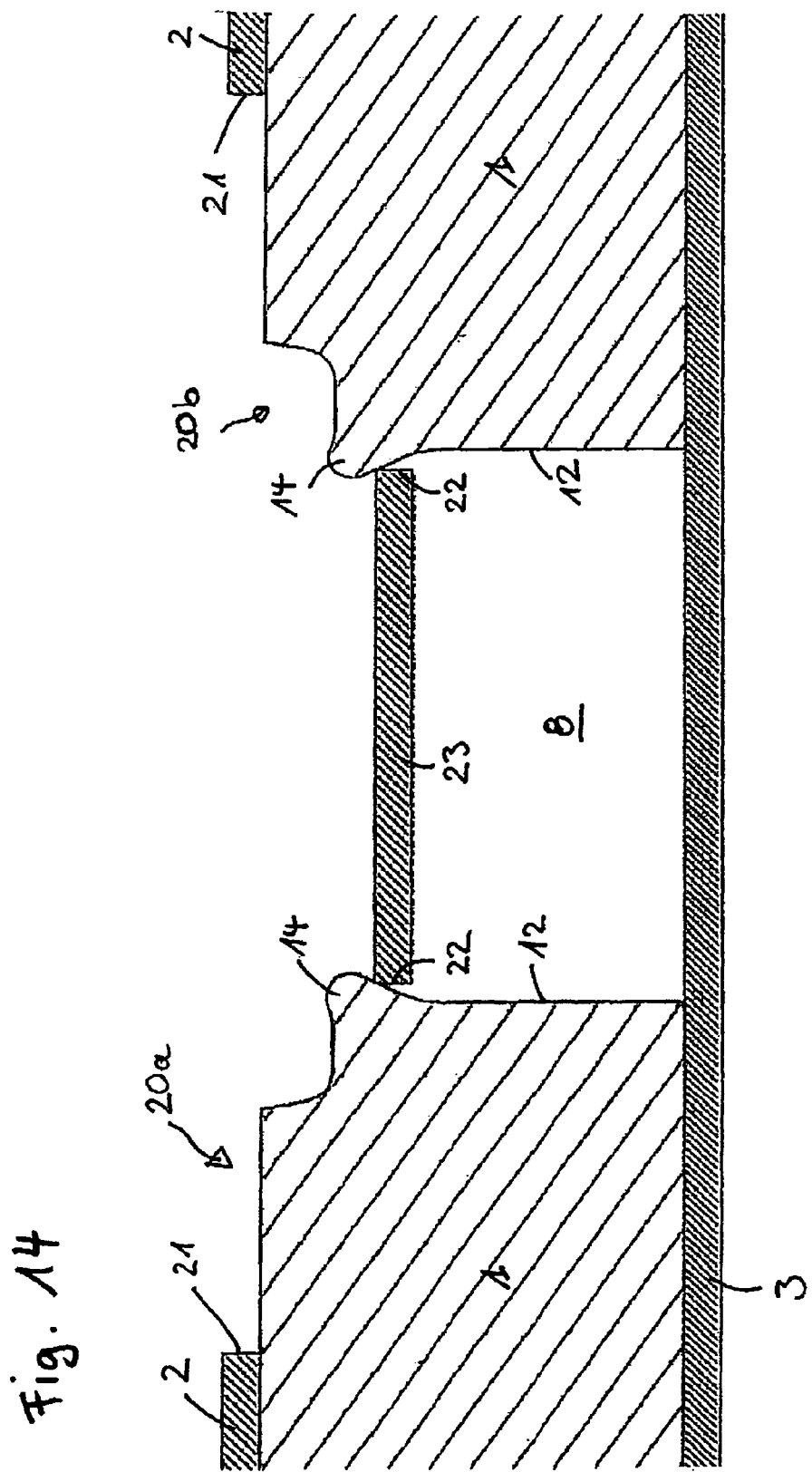
Figure 15:
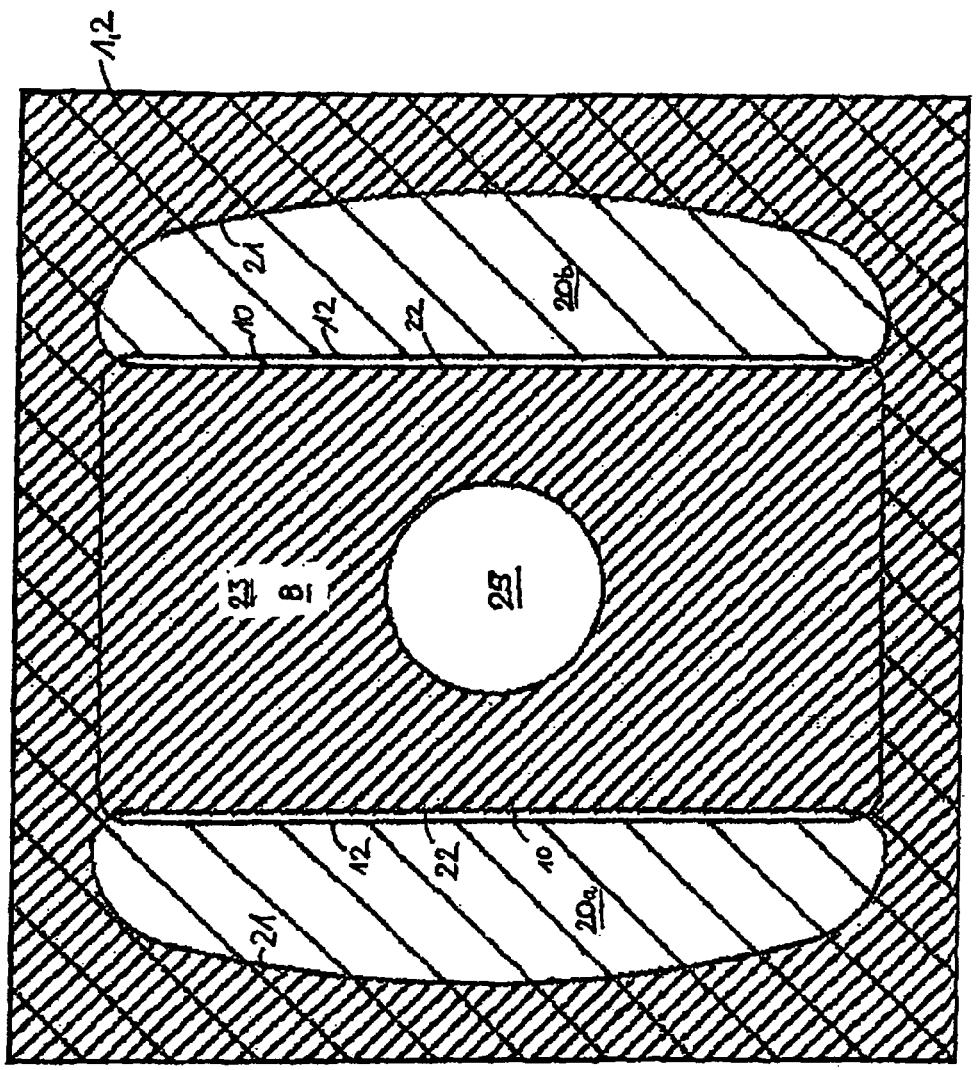
Figure 16:
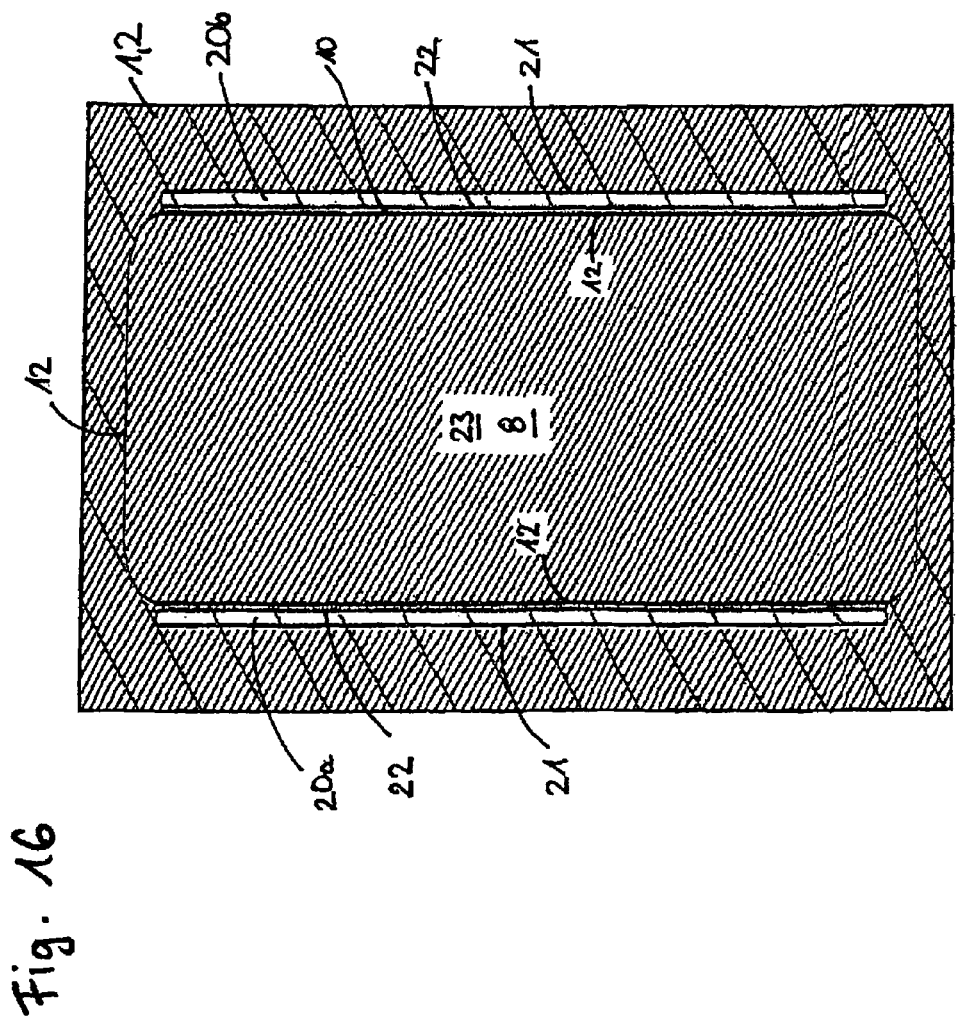
Figure 17:
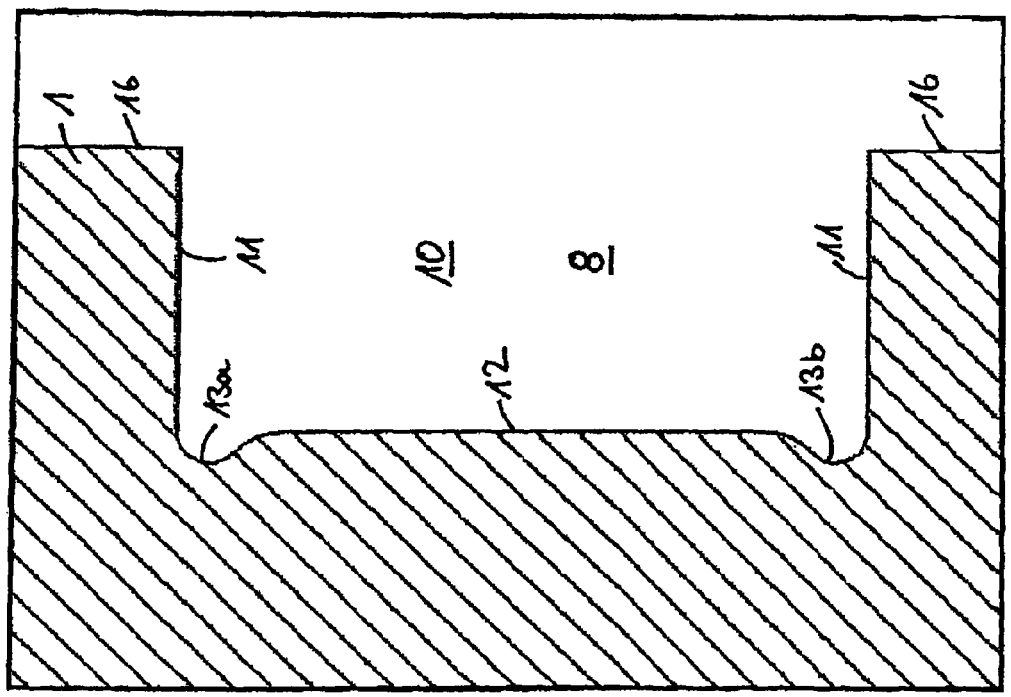
Figure 18:
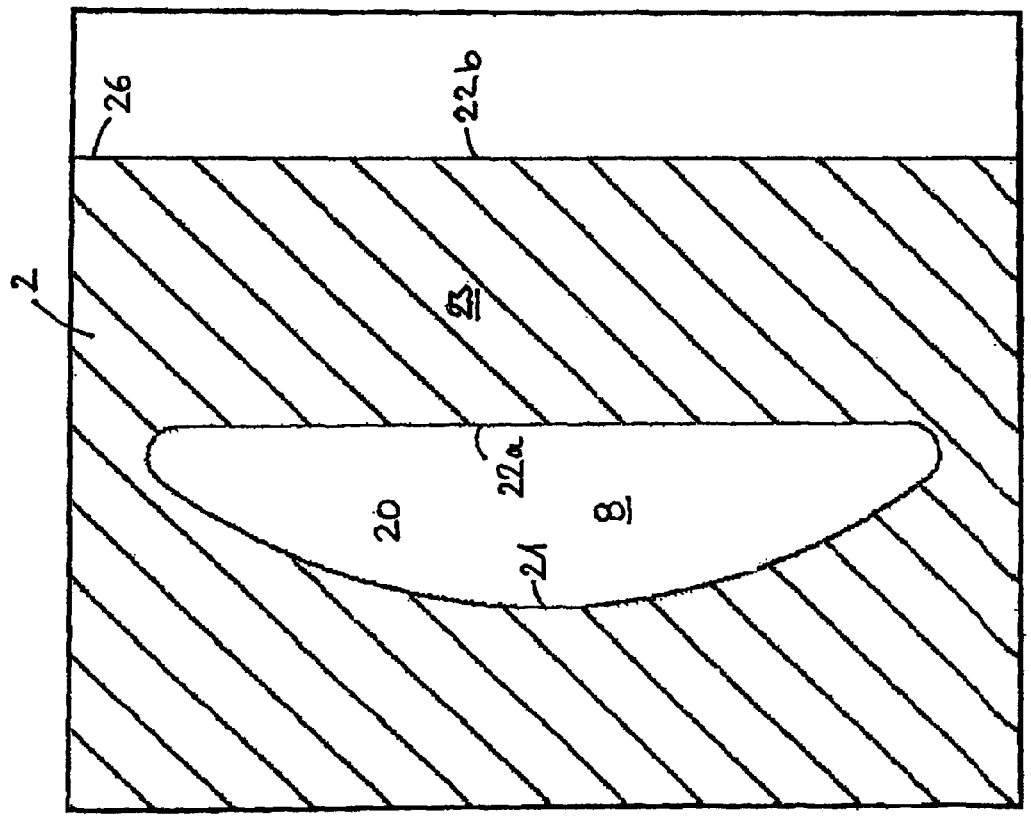
Figure 19:
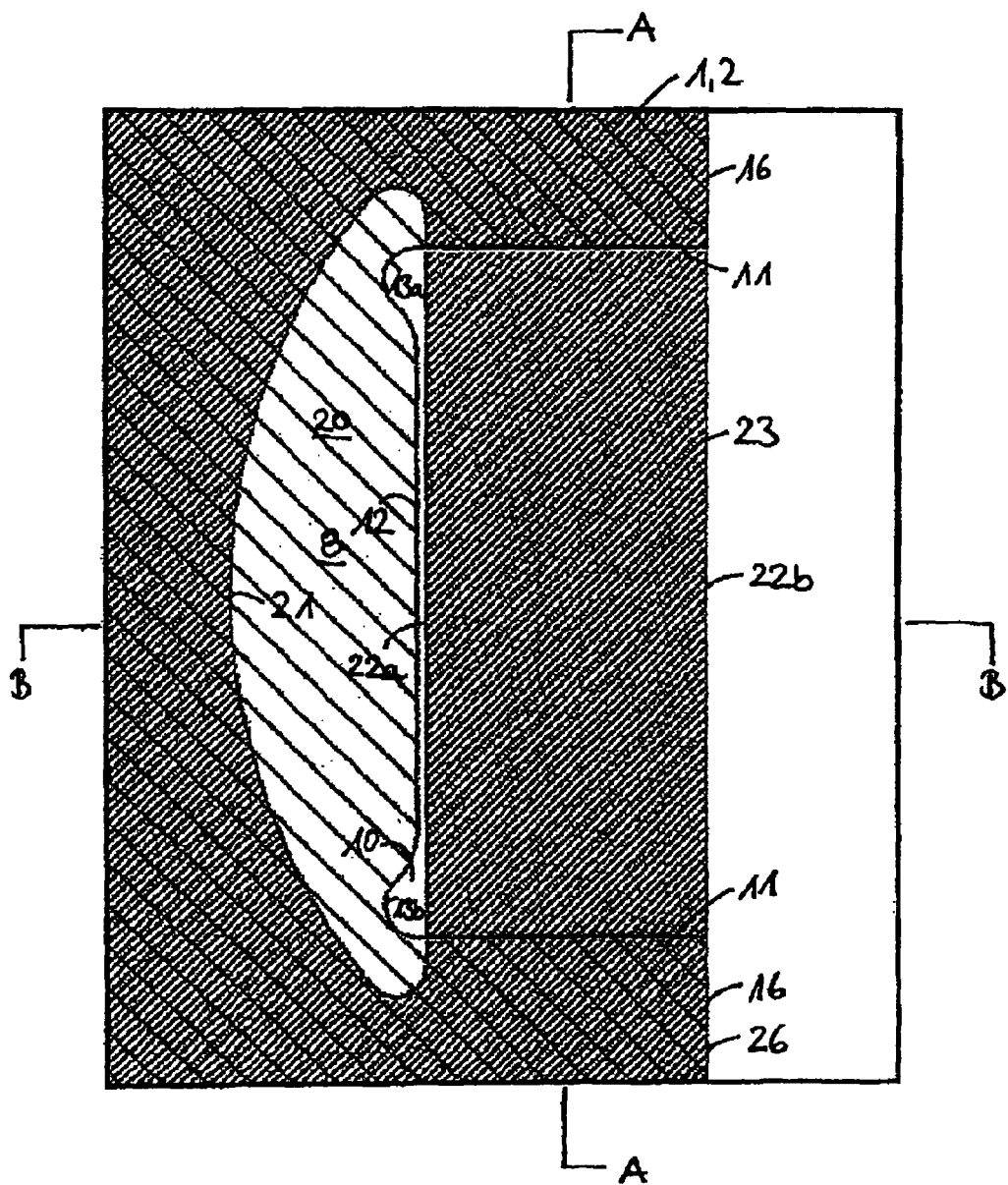
Figure 20:
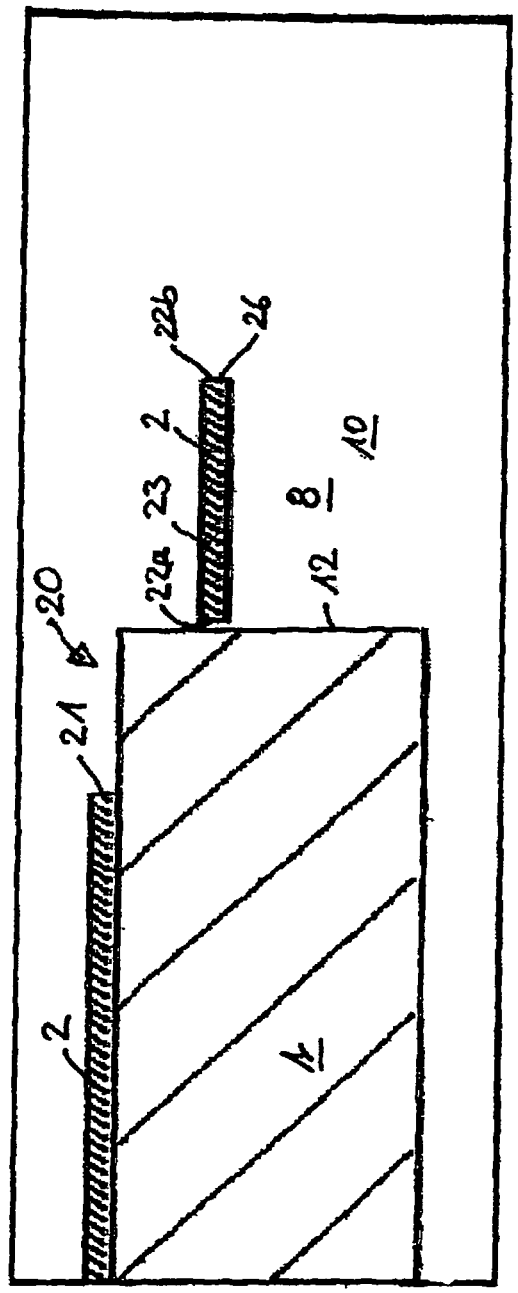
Figure 21:
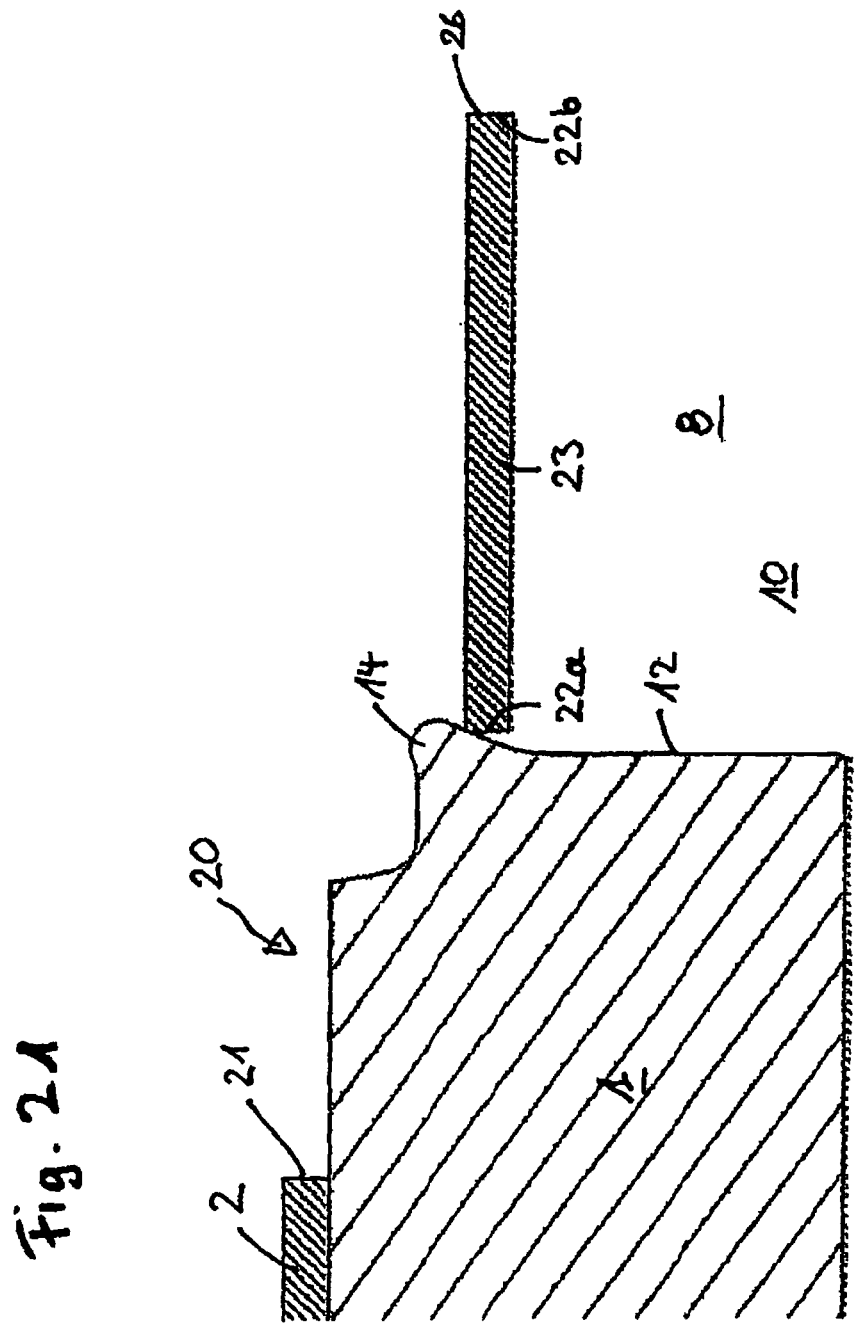
Figure 22:
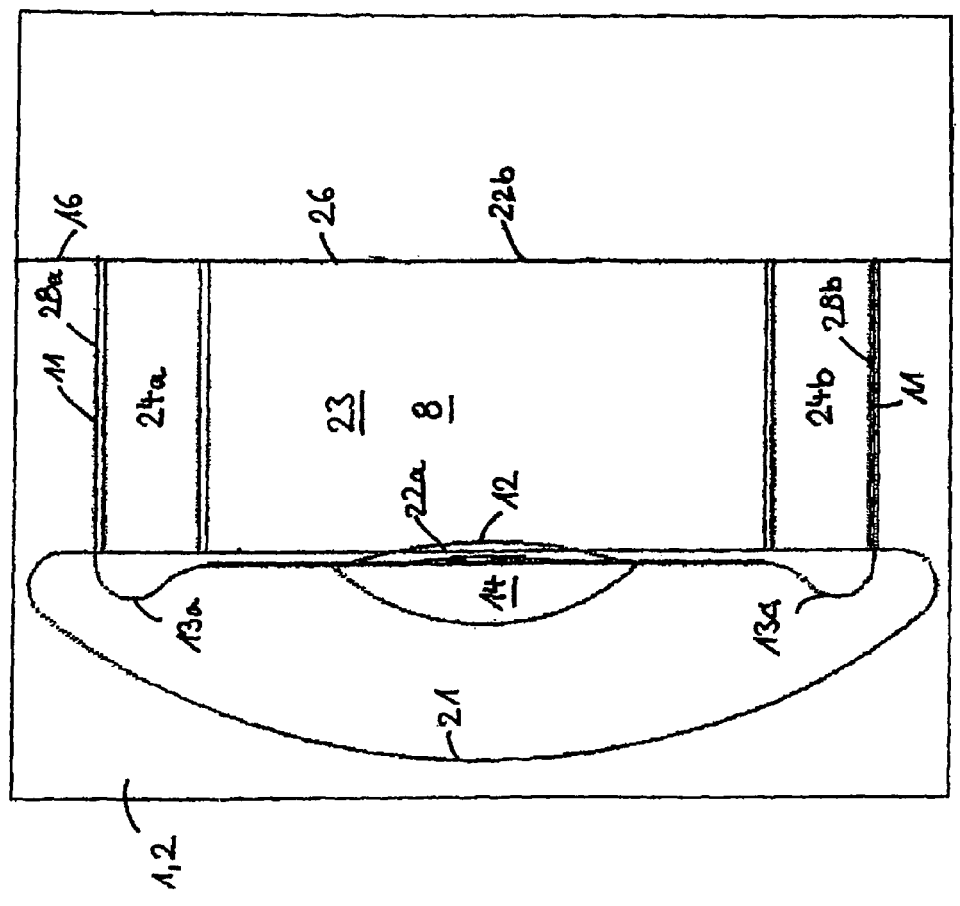
Figure 23:
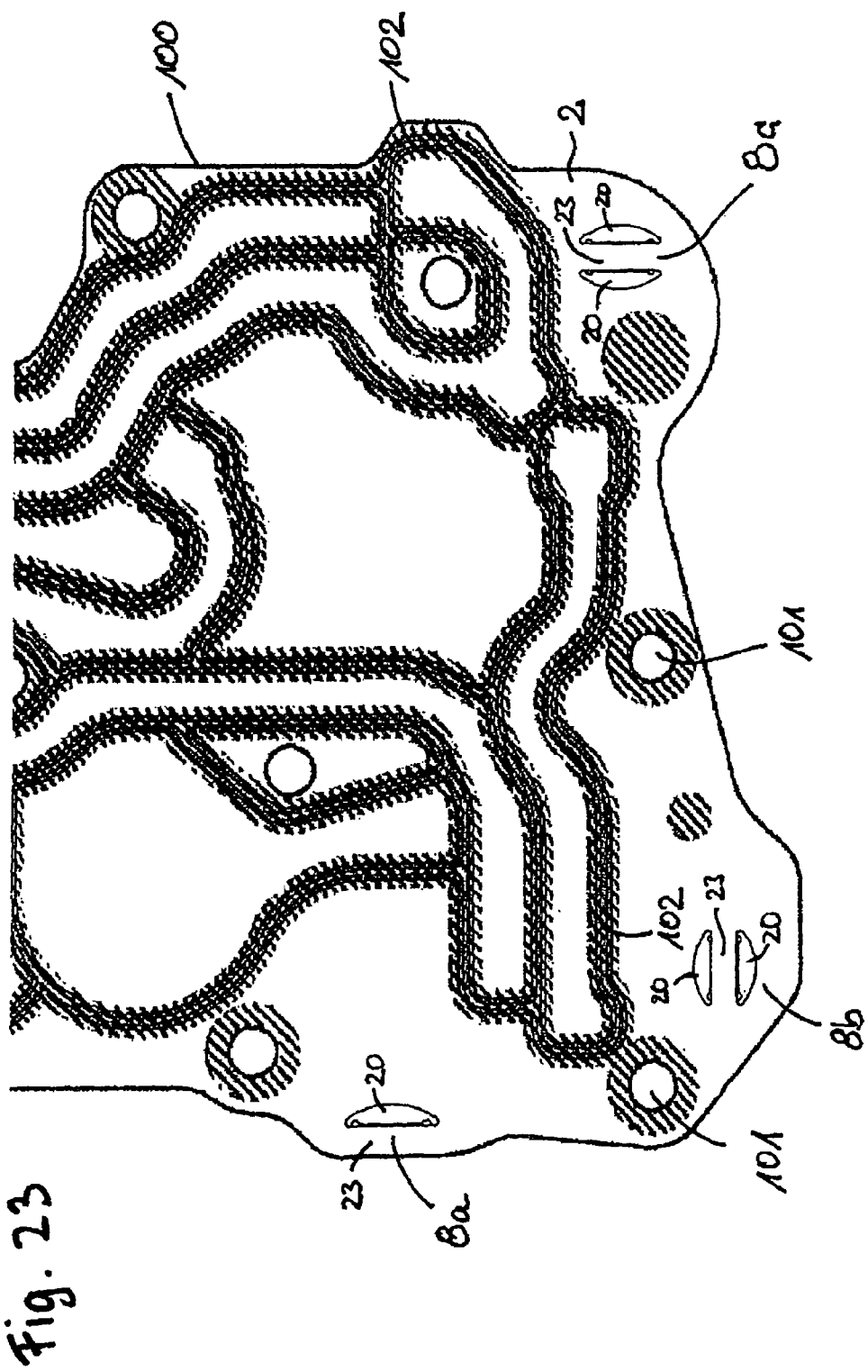
Figure 24:
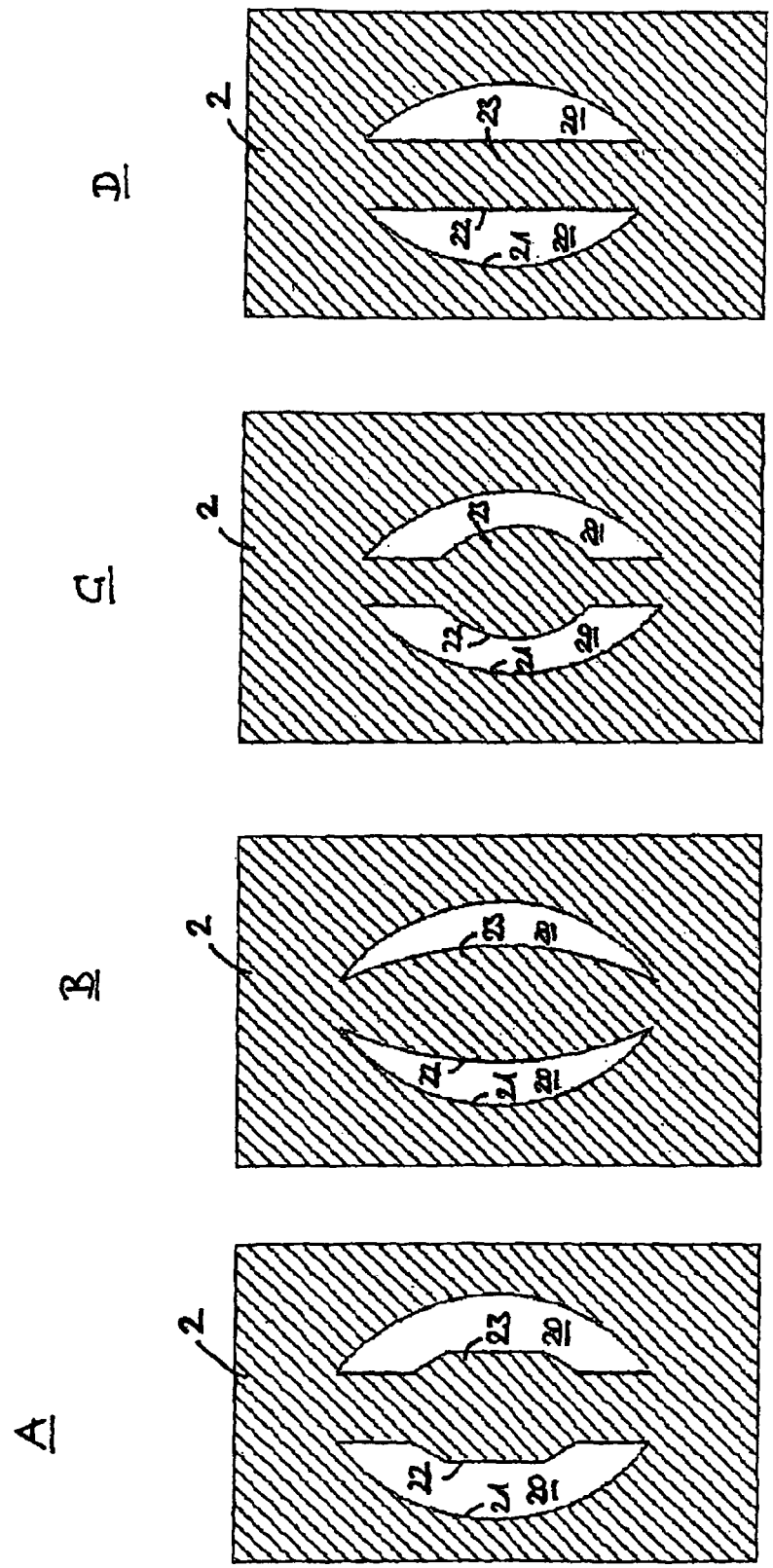
Figure 25:
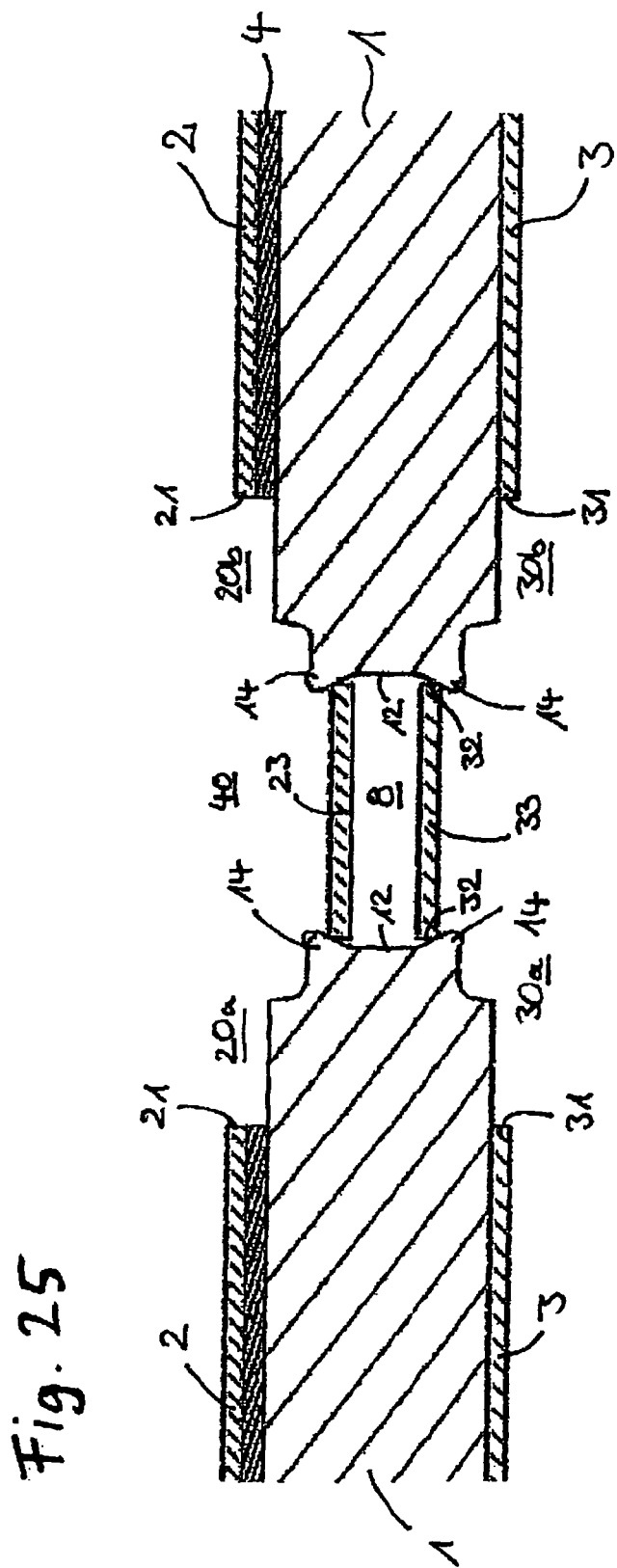
Figure 26:
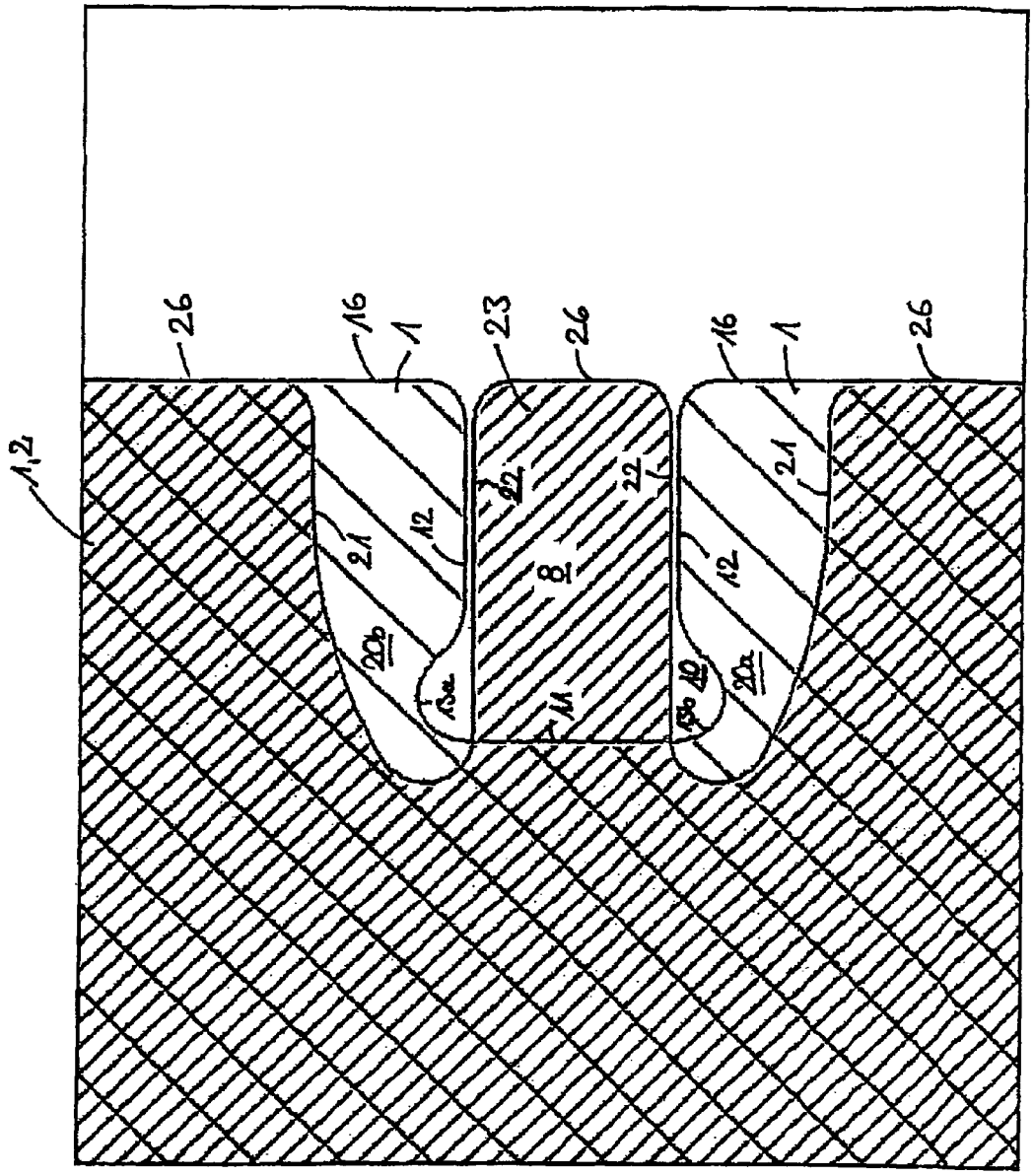
Figure 32:
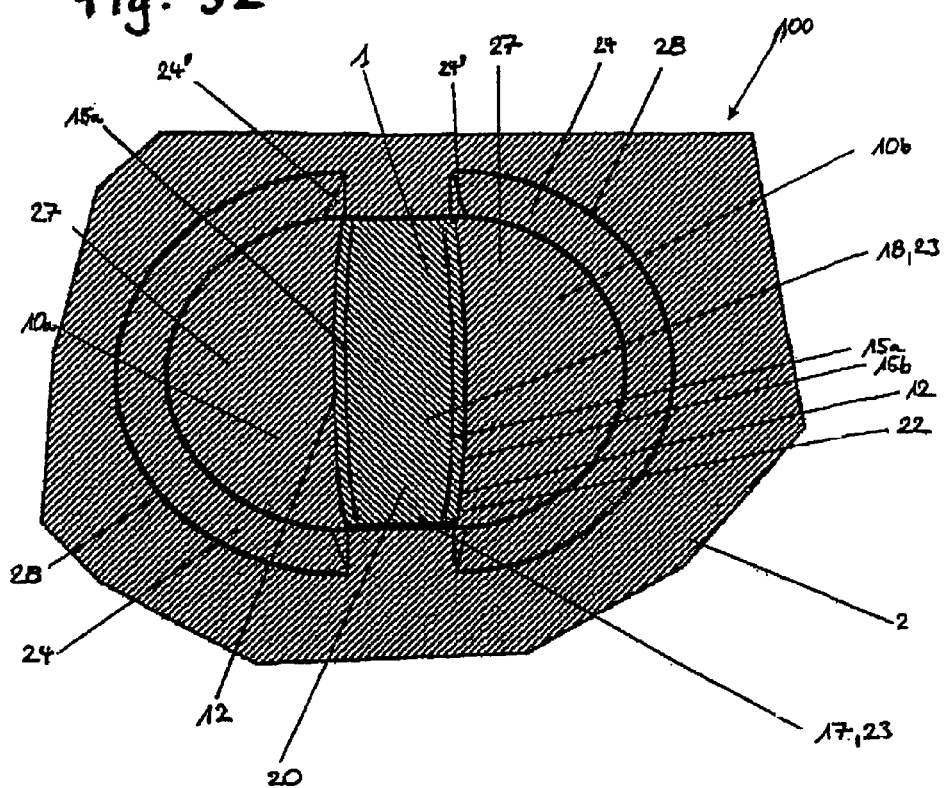
Figure 33:
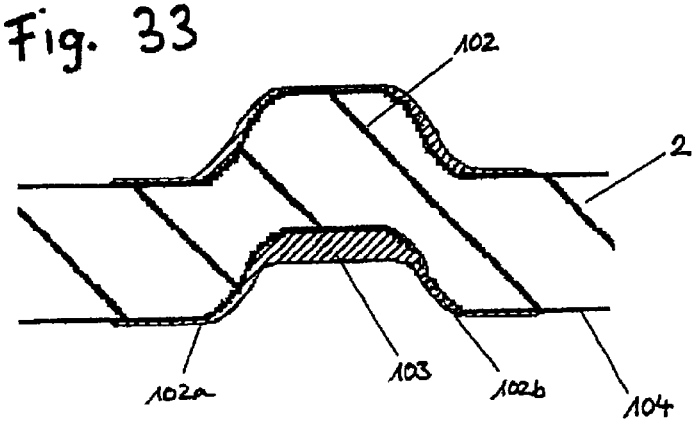

FIG. 1 A transmission control plate;

FIG. 2 A first layer in the area of a connection portion according to a first example;

FIG. 3 A second layer in the area of a connection portion according to the first example;

FIG. 4 A top view/phantom view to first and second layers according to FIGS. 1 and 2 arranged one on top of the other in the not yet connected state;

FIG. 5 A cross-section through a connection portion along line A-A in FIG. 4;

FIG. 6 A cross-section through a connection portion along line B-B in FIG. 4;

FIG. 7 A cross-section through a connection portion along line B-B in FIG. 4 after the connection of the first and second layer according to the invention;

FIG. 8 A top view/phantom view to first and second layers arranged one on top of the other according to FIG. 7 after connection of the first and second layer;

FIG. 9 A cross-section through a connection portion according to a second example prior to the connection;

FIG. 10 A further cross section through a connection portion according to the second example prior to the connection;

FIG. 11 A further cross section through a connection portion according to the second example after the connection of a first layer, a second layer and a third layer;

FIG. 12 A cross section through a connection portion according to a third example prior to the connection;

FIG. 13 A cross section through a connection portion according to the third example prior to the connection;

FIG. 14 A cross section through a connection portion according to the third example after the connection of a first layer and a second layer;

FIG. 15 A top view/phantom view to a connection portion according to a fourth example;

FIG. 16 A top view/phantom view to a connection portion according to a fifth example;

FIG. 17 A top view to the area of a connection portion of a first layer according to a sixth example;

FIG. 18 A top view to the area of a connection portion of a second layer according to the second example;

FIG. 19 A top view/phantom view to the first and the second layer of a connection portion according to the sixth example;

FIG. 20 A cross section through a connection portion according to the sixth example;

FIG. 21 A cross section through a connection portion after the connection of a first and a second layer according to the sixth example;

FIG. 22 A top view/phantom view to a connection portion after the connection according to the sixth example;

FIG. 23 A top view/phantom view to a section of a transmission control plate according to a seventh example;

FIG. 24 Four different exemplary possibilities for a design of an area of the connection portion of a second layer;

FIG. 25 A cross section through a connection portion after the connection of four layers according to an eighth example;

FIG. 26 A top view/phantom view to the first and the second layer of a connection portion prior to the connection according to a ninth example;

FIG. 27 A top view/phantom view to an area of a transmission control plate according to a tenth example;

FIG. 28 In two partial figures detailed top views to connection portions according to the tenth example;

FIG. 29 A top view to a connection portion according to an eleventh example;

FIG. 30 In a twelfth example three different exemplary designs for connection portions in cross section;

FIG. 31 A sectional view of a connection portion according to a thirteenth example;

FIG. 32 A top view to a connection portion according to a fourteenth example;

FIG. 33 A cross section through an exemplary coated, beaded area of a sealing layer of a control plate for a hydraulic system/transmission control plate as a fifteenth example;

FIG. 34 A sectional view of a connection portion according to a sixteenth example; and FIG. 35 A sectional view of a connection portion according to a seventeenth example.

DETAILED DESCRIPITON OF THE INVENTION

FIG. 1 shows an exploded view of a three-layered transmission control plate 100, as it is in particular used in transmissions of vehicles for the control of the hydraulic. Such transmission control plates at the same time comprise a sealing function and are therefore designed as flat gaskets.

The transmission control plate 100 shown in FIG. 1 shows three layers. As the central layer, a distance layer 1 is provided, adjacent to which distance layer, the first sealing layer 2 and the second sealing layer 3 are arranged. A distance layer usually shows a considerably larger thickness than the adjacent sealing layers. FIG. 1 shows the transmission control plate 100 in the non-mounted state with the layers 1, 2, and 3 not fixed to each other.

The individual layers of the transmission control plate 100 show passage openings 101 for a hydraulic fluid. On the sides facing the distance layer 1 as well as on the sides of the sealing layers 2 and 3 pointing away from the distance layer, sealing elements 102 are arranged, which in part are provided with a coating 103, which sealing elements serve for the guidance of hydraulic fluid. Such sealing elements may for instance be beads—full beads or also half beads—or also elastomeric coatings. Between these sealing elements 102 and 103, respectively, non-coated areas 104 are given, too, on the individual layers of the transmission plate.

The individual layers of the transmission control plate 100 are connected to each other via connection portions in such a way, that the transmission control plate can be transported and handled as a unit. In the installed state, these connection portions have reduced meaning as the transmission plate is then sufficiently retained between two parts, between which the transmission control plate 100 seals and purposefully guides the hydraulic liquid.

The following examples are explained on the example of a transmission control plate, they are however immediately transferable to other kinds of flat gaskets, such as cylinder head gaskets or exhaust manifold gaskets, which also show a multi-layer construction, often with a distance layer and one or several sealing layers.

FIG. 2 shows a top-view to a carrier layer 1 as first layer in the area of a connection portion according to a first example according to the invention. In FIG. 2, only the section around a connection portion 8 is shown.

The carrier layer or distance layer 1 in the area of the connection portion 8 shows a recess 10, which in the present example essentially corresponds to a rectangle. Only at the four corners of the rectangle, both longitudinal sides, thus the longer sides, show notches 13a, 13b, 13c and 13d.

The recess 10 in the layer 1 shows a border 11, which at the longitudinal sides, approximately at half the length of the longitudinal sides, is provided with the reference number 12. As will be shown later, this area 12 of the outer border of the recess 10 will be compressed at least in sections for the connection with adjacent layers.

FIG. 3 shows a top view to a sealing layer 2 as the second layer according to the same embodiment. Here, the same section around the connection portion 8 as in FIG. 2 is shown.

The sealing layer 2 in the area of the connection portion 8 shows recesses 20a and 20b, which recesses in turn are separated from each other by a bridge 23. From an alternative point of view, the sealing layer 2 shows a recess, through which a bridge 23 extends from one side of the sealing layer 2 to the other side of the sealing layer 2 and which separates the recess into two parts 20a and 20b.

The recesses 20a and 20b both show an outer edge 21, which in the area of the central section, in which the edge 21 extends along the bridge 23, in each case is provided with the reference number 22. As will be illustrated later, these areas 22 serve as free edges for the connection of the sealing layer 2 with the distance layer 1.

In a transmission plate 100 as it is shown in FIG. 1, the second sealing layer 3 may also be designed comparably in order to provide for a connection portion to the distance layer 1, too.

FIG. 4 now shows a top view/phantom view through the layers 1 and 2, when these are arranged one on top of the other in their correct position. Though, no connection between the layers 1 and 2 has been realized yet. The area hatched from the top left to the lower right represents the distance layer 1, while the area hatched from the top right to the lower left shows the sealing layer 2.

One can realize that in this embodiment, the bridge 23 shows a smaller width than the inner width of the recess 10 in the distance layer 1 in the area of the border 12. With this, it is possible to press the bridge 23 into the recess 10.

FIG. 5 now shows a cross section along the line A-A in FIG. 4 yet prior to the interconnection of both layers. In FIG. 5, the bridge 23 is now already pressed into the recess 10 of layer 1, so that its outer edge adjacent to the border 11 of layer 1 extends within the layer thickness of the first layer 1. To this end, the layer 2 in the area of the recess 10 is provided with crankings 24a, 24b, which starting at a knee portion 28 form an area that extends under an inclined angle α relative to the plane of the layer 2, while the center area 27 of the free edge 22 between the crankings 24a, 24b extends parallel to the plane of the layer.

When considering FIG. 4 in combination with FIGS. 2 and 5, one can realize that the borders 11 are prolonged in a straight linear manner using notches 13a, 13b, 13c and 13d, in order to provide for sufficient space and to avoid the formation of chips during cranking.

FIG. 6 is a cross section through the layer 1 and the layer 2 along line B-B in FIG. 4 yet prior to the interconnection of the two layers. The bridge 23 of the sealing layer 2 in this area extends within the layer thickness of the first layer 1.

FIG. 7 shows the same cross section as FIG. 6, now however after the connection of layers 1 and 2 to a flat gasket according to the invention. To this end, the area of the border 12 is compressed above the bridge 23 in such a way that lugs 14 are advantageously formed, which overlap the bridge 23 at its free edges 22. With this, a positive fit between the lugs 14 and the free edges 22 of the bridge 23 in the direction orthogonal to the plane of the layer results, which prevents the layer 2 from getting loose from the distance layer 1. As a consequence, both layers 1 and 2 are sufficiently connected to each other for a transport.

FIG. 8 again shows a top view/phantom view through the layers 1, 2 arranged one above the other in the connected state.

In the central area of the free edges 22 of the bridge 23 of the sealing layer 2, the material of the distance layer 1 has been compressed with a concentric stamp in such a manner that the border 12 of the distance layer 1 now reaches over the free edges 22. In an embodiment, the same tool stamp, when designed in a suited manner, can be used for the shaping and cranking of the bridge 23 of the sealing layer 2 and subsequently for the compression of the border 12 of the distance layer 1.

FIG. 9 shows a second embodiment of the present invention for a connection portion 8 in the not yet connected state. In addition to the first embodiment, apart from the distance layer 1 and the first sealing layer 2, now on the side of the distance layer 1 opposite to the first sealing layer 1, a second sealing layer 3 is provided, which in the area of the connection portion 8 is designed mirror-symmetric relative to the sealing layer 2. FIG. 9 shows a cross section as in FIG. 5. In the same way, the sealing layer 3 comprises crankings 34a, 34b which are symmetric to the crankings 24a, 24b, so that the sealing layer 3 inside the recess 10 of the distance layer 1 forms a bridge 33.

FIG. 10 shows a cross section as in FIG. 6 in the not yet connected state, however, now for the second embodiment. The sealing layer 3 shows recesses 30a, 30b corresponding to the recesses 20a, 20b in the layer 2, outer edges 31 of the recesses 30a, 30b as well as a bridge 33 with free edges 32, which is shaped and arranged symmetric to the bridge 23 of the sealing layer 2.

FIG. 11 shows a cross section through a connection portion 8 as in FIG. 7 in the connected state, however, now for the second embodiment. The distance layer 1 in the area of its border 12 is now not only shaped to form lugs 14 above the bridge 23, but also below the bridge 33 of the sealing layer 3. Therefore, the lugs 14 now reach over the bridges 23 and 33 on the outer side and this way connect the layers 2 and 3, respectively, with the distance layer 1 to form a three-layered flat gasket. With this arrangement of the connection portion between layers 1 and 2 and the connection portion between layers 1 and 3 one above the other, the flat gasket in this area is not fluid-tight. However, outside of the connection portion in layers 2 and 3, sealing elements may be provided which encircle the connection portion 8.

FIG. 12 shows a cross section as in FIG. 9, however, now for a third embodiment. In this embodiment, the sealing layer is not designed as in FIG. 9, but shows neither a recess nor a bridge. At this portion, only the sealing layer 2 is connected with the distance layer 1 according to the invention. This is shown in the cross sections in FIG. 13 and in FIG. 14, which correspond to the representations in FIG. 10 and FIG. 11, however without the corresponding design of the sealing layer 3. The sealing layer 3 may advantageously be connected to the distance layer 1 according to the invention at other portions of the distance layer 1. With this, it is then possible to connect all three layers 1, 2, and 3 with each other to form a connected flat gasket. With such a shift of the connection portions in the plane of the layer, it is advantageous that e.g. the connection portion 8 shown in FIG. 14 is fluid tight orthogonally, thus orthogonal to the plane of the distance layer 1 due to the continuous sealing layer 3. In the second embodiment shown in FIG. 11, the connection portion 8 is not fluid tight in transversal direction to the plane of the distance layer 1, as the fluid here can flow from one side of the flat gasket to the other side of the flat gasket in the area of the crankings 24a and 24b as well as in the area of the notches 13a to 13d.

With all these connection portions 8 according to the invention, it is advantageous that in contrast to rivets, no thickening of the flat gasket results. With this it is possible to realize these connection portions also in the compression area of the flat gasket.

FIG. 15 shows a connection portion 8 of a fourth embodiment in a top view/phantom view through the distance layer 1 and the sealing layer 2 in a comparable representation as in FIG. 4 in the not yet connected state. The distance layer 1 is illustrated with a hatching from the top right to the lower left, while the sealing layer 2 is given with a closer hatching from the top left to the lower right. The recess 10 now shows no notches at its corners. The bridge 23 now at its center shows a passage or opening 25, which advantageously is formed circularly. At this opening 25, tools can be centered, e.g. for the connection of the layers.

FIG. 16 shows a top view/phantom view to a connection portion 8 of a fifth embodiment. In this embodiment, the distance layer 1 is represented with a hatching from the upper right to the lower left and the sealing layer 2 with a more narrow hatching from the upper left to the lower right. As in FIG. 15, the distance layer 1 now shows no notches 13a to 13d, which can only represent an isolated and optional characteristic of the invention.

Further, the bridge 23 in the fifth embodiment is slightly broader than the corresponding inner width of the recess 10 in the distance layer 1. As a consequence, in the non-compressed state the bridge projects beyond the border 12 of the distance layer 1. During the compression and the subsequent connection of both layers 1 and 2, the bridge is however pressed into the recess 10, so that finally a similar connection as in the preceding embodiments results.

FIG. 17 shows a top view to a distance layer 1 in a sixth embodiment in the area of a connection portion 8. The recess 10 is now provided at an outer rim 16 of the distance layer 1, so that only one border 12 results. In a comparison with FIG. 2, one can realize that the sixth embodiment provides for a connection at the left border 12 in FIG. 2 and quasi represents "half" a connection portion 8 as in FIG. 2.

FIG. 18 shows a top view to a second layer in the area of a connection portion 8, e.g. a sealing layer 2 in the sixth embodiment. This sealing layer 2 now only shows one recess 20 with an outer edge 21. The outer edge together with the area with the reference number 22a forms a free edge, which is provided for the connection with the distance layer 1. At the same time, this free edge 22a together with the area 22b of the outer rim 26 of the sealing layer 2 forms a bridge 23.

FIG. 19 now shows a top view/phantom view through the layers 1 and 2 or the sixth embodiment arranged one on top of the other in the not yet connected state. The free edge 22a of the bridge 23 is now adjacent to the border 12 of the recess 10 in the distance layer 1.

FIG. 20 is a cross section through both layers 1 and 2 along the line B-B in FIG. 19 in the not yet connected state. Here the bridge 23 is already cranked in such a manner that in the area of its free edge 22, it extends adjacent to the distance layer 1, within the thickness of the distance layer 1.

While the FIGS. 17 to 20 show the two layers 1 and 2 in the not yet connected state, FIG. 21 as well as FIG. 22 show the area of the connection portion of the flat gasket according to the invention according to the sixth embodiment in the connected state. FIG. 21 there shows a cross section corresponding to FIG. 20. However, here, in addition to the cranking of the bridge 23, the border 12 of the distance layer is compressed in such a manner that the material flows while forming a lug 14 and reaches over the bridge 23 in the area of the free edge 22. This results in a positive fit between the distance layer 1 and the sealing layer 2, which prevents from a movement of the sealing layer 2 orthogonal to the distance layer 1.

If such connection portions are provided between the distance layer 1 and the sealing layer 2 at larger scale, then the assemblage of distance layer 1 and sealing layer 2 can be fastened in a stable manner. If the bridges 23 of the different connection portions at least partly are rotated against each other with respect to their orientation, e.g. at different sides of the flat gasket, a securing of the sealing layer 2 against a lateral movement relative to the distance layer 1 takes place, too. With this, the sealing layer 2 can be completely fixed relative to the distance layer 1.

FIG. 22 shows a top view/phantom view through the layers 1 and 2 in the connected state in the area of a connection portion 8. Here, one can realize that in the area of the lug 14, the border 12 of the distance layer 1 reaches over the bridge 23 in the area of the free edge 22. The two outer rims 16 and 26 here together form a continuous outer rim of the flat gasket, which advantageously is free of any shift.

FIG. 23 shows a section from a transmission control plate 100 in a seventh embodiment. In this top view to the upper sealing layer 2, different connection portions 8a, 8b and 8c can be identified. In a phantom view through the recesses 20, the areas of a distance layer situated below are visible.

The connection portion 8a is designed as in the sixth example, while the connection portions 8b and 8c are shaped like the connection portion of the first example. The orientation of the bridges 23 of both connection portions 8b and 8c are orthogonal to each other, so that the two connection portions do not only provide for a positive fit in a direction orthogonal to the plane of the layer 2, but result in a positive fit in both cartesian coordinates within the plane of the layer 2, too, and therefore of the entire transmission plate 100. With this, the layers 1 and 2 can no longer be shifted against each other or slip.

As the layers of the transmission control plate 100 are secured against a lateral shift with these two connection portions 8b and 8c, it is sufficient to provide a connection which is only effective orthogonal to the plane of the layer at further connection portions, e.g. at connection portion 8a, e.g. by a connection portion as according to the sixth example.

In FIG. 24, further possibilities of design for the bridge 23 and the recess 20 are depicted for further embodiments. The bridge 23 may for instance be broadened in the middle in the area of the free edge 22, as in FIG. 24-a. A similar broadening is shown in FIG. 24-b or also in FIG. 24-c. A straight design of the bridge 23 is illustrated in FIG. 24-d. FIG. 24-d corresponds to the designs in the examples resented before.

FIG. 25 shows a connecting portion 8 of an eighth embodiment. In this embodiment, the connecting area to a large degree is designed identical with the one in FIG. 11, thus the second example. FIG. 25 shows a corresponding cross section as FIG. 11.

As a deviation from the second embodiment, here a further layer 4 is additionally provided between the distance layer 1 and the first sealing layer 2, e.g. a mesh layer. This layer 4 in the region of the connection portion 8 shows a passage opening 40. The bridge 23 of the gasket layer 2 is cranked within the passage opening 40 and connected to the distance layer 1 in the same way as in the second embodiment. Through this connection, the gasket layer 2 is connected to the distance layer 1 with positive fit in a direction orthogonal to the extension of the layers. As the further layer is located between the distance layer 1 and the first sealing layer 2, this further layer due to the connection of the distance layer 1 with the sealing layer 2 is also retained between these two layers.

FIG. 26 shows a top view/phantom view to the first and second layer, which are arranged one above the other but still in the non-connected state, according to a ninth example. This example is designed similar to the one of FIG. 4, thus the first example. Other than in the first example as it is shown in FIG. 4, the connecting area 8 now is arranged at the outer rim 16 of the first distance layer 1 and the outer rim 26 of the first sealing layer 2. This results in a connection portion, which essentially corresponds to the upper half of the illustration in FIG. 4.

The distance layer again shows a recess 10, the edge 11 of which recess at both sides of the recess 10 directly continues into the outer rim of the distance layer 1. This results in an indentation into the distance layer 10.

In the same way as shown for the first embodiment in FIG. 4, the second sealing layer 2 comprises recesses 20a and 20b, which are separated from each other by a bridge 23. The recesses 20a and 20b open towards the rim 26 of the second sealing layer 2, so that the bridge 23 forms a tongue protruding from the sealing layer 2. The outer edge 22 of the tongue in this embodiment is immediately neighboring the outer border 12 of the recess 10. In the same way as the bridge of the first embodiment, the tongue 23 is cranked, so that the outer edge 22 at least in sections lies within the plane of the recess 10. When the two layers 1 and 2 are connected in a corresponding way as illustrated in the first example in FIG. 7, a positive fit in the direction orthogonal to the plane of the layers results between the distance layer 1 and the sealing layer 2.

The connection portion 8 depicted in this examples can be provided several times along the outer rims 16 and 26 of layers 1 and 2. If the orientation of the tongues 23 at different connection portions is rotated with respect to one another, it is possible to achieve a complete and stable connection of layers 1 and 2 by providing for instance four connection portions 8 at four sides of the sealing construction, such a connection can also not be shifted within the plane of the layer.

FIG. 27 represents a section of a top view or a virtual phantom view through a control plate for a hydraulic system 100 according to a tenth embodiment and shows connection portions 8a and 8b. While the connection portion 8b is located close to the outer rim of the control plate for the hydraulic system 100, but it does not reach to the outer rim of the control plate of the hydraulic system 100. In contrast, connection portion 8a reaches until the outer rim of the control plate for the hydraulic system 100. An illustration of a coating has been dispensed with in FIG. 27.

FIG. 28-a shows a connection portion according to the tenth embodiment corresponding to the connection portion in FIG. 27, but in the assembled, only not yet connected state. The sealing layer 2, which over the largest part of its area is arranged at the top, shows an arc-shaped recess 20 and is cranked along this recess over a large distance. The cranking 24 consists in a section which starting from a knee portion 28 extends in an inclined manner downwardly from the plane of the layer 2 and in an adjoining section 27, which extends essentially parallel to the plane of the sealing layer 2. A section of the distance layer 1 has been taken up inside the recess 20. The section consists in a small connecting bridge 17 which seamlessly continues into a corner-free stamp-like head 18. The connection bridge 17 and the head 18 together show a shape, which resembles a puzzle connection, the connection bridge 17 can thus essentially be considered as a neck. The outer border 12 of the head in a projection to a common plane essentially corresponds to the edge 22 of the recess. The former, thus the outer border 12, is preferably slightly distanced to the latter, thus to the edge 22, in order to allow for a smooth insertion of the head 18. Adjacent to the head 18, the distance layer 1 is recessed in an arc shape about as far as to the knee portion 28 of the sealing layer 2. This recess 10 again takes up the cranking 24 of the sealing layer 2.

In FIG. 28-b, the same connection portion as in FIG. 28-a is shown, now however in the connected state. A notch 15a extends along and distanced to the outer border 12 of the head 18. This results in a small, lunate area 15b, which extends between the notch 15a and the outer border 12. With the indenting of the notch 15a, this lunate area 15a has been deformed so that it extends beyond the original course of the border 12. Due to this reshaping, the course of the border 12 reaches beyond the edge 22 of the recess 20 of the sealing layer 2 and holds the latter tightly with positive fit.

FIG. 29 as an eleventh embodiment shows a connection portion comparable to the connection portion 8a in FIG. 27. It differs from the connection portion 8a or the connection portion 8b considered closely in FIG. 28 mainly in that the distance layer 1 here is recessed over a larger area and that the course of the cranked area 24 in the sealing layer 2 is adapted to the recess 10. The margin of this recess 10, indicated with a dot-dashed line, starting from head 18 and connection bridge 17 first continues as in the preceding embodiment on both sides in a slightly curved way and doing so diverges from the connection bridge 17, before its direction extends parallel to the center line M of connection bridge 17 and head 18. Now, other than in the preceding example, no junction of the two edges of the recess 10 takes place, which would cause a ring closure and therefore a closure of the recess 10, but the edges extend further in parallel to the center line M and merge with the outer rims 16 of the distance layer 1. The bending line 28 of the cranking 24 extends parallel to the border of the recessed area 10 cut out in the distance layer 1 with a slight offset towards the interior of the recess 10 in the distance layer 1. As in FIG. 28-b, the connected state is shown here as well; the lunate area 15b adjoining to the notch 15a has shifted over a section of the cranked area 27 of the sealing layer 2 and retains it with positive fit.

FIG. 30 as twelfth examples shows sectional views through further embodiments of connection portions 8 according to the invention.

FIG. 30-a shows a section through a connection portion, e.g. along line A in FIG. 28-a, which represents a connection between a distance layer 1 and a sealing layer 2 in the not yet connected state. This can either be a connection portion of a three-layered system which is considered without a further gasket layer 3 arranged on the lower side of the distance layer, or the connection portion of a two-layered system. FIG. 30-a points out that the distance layer 1 in the area 10 around the head 18 is cut out as a recess 10, while the recess 20 of the sealing layer 2 essentially extends over the area of the head 18. The outer border 11 of the recess 10 in a projection into a common plane coincides with the course of the bending line 28 of the cranking 24. The section of the cranking 24 which extends in an inclined manner essentially covers an area which corresponds to the height H4 of the distance layer 1, so that the plane area 27 of the cranking towards the lower side is essentially flush with the lower side of the head 18 and does not project.

FIG. 30-b correspondingly provides a section though the connection portion of FIG. 28-b, thus shows the connected state of the connection portion of FIG. 30-a. The head 18 on both sides shows a notch 15a, which is separated by a small area 15b from the outer border 12 of the head. Due to the notches, the small area 15b is deformed towards the outer border 12 and reaches over the free edge 22 of the sealing layer 2. Therefore, the distance layer protrudes over a short section of the surface of the lowered section 27 of the cranking 24 and this way retains the sealing layer 2 with positive fit.

FIG. 30-a shows a sectionalized cross section through a three layered control plate for a hydraulic system 100 according to the invention. In the section shown, both a connection portion 8 of first sealing layer 2 and distance layer 1 and a connection portion 8' of second sealing layer 3 and distance layer 1 can be identified. Both connection portions are shown in the connected state. The connection portion 8 here corresponds to the connection portion shown in FIG. 30-b except for the difference that the second sealing layer 3 cover the connection portion 8. The area 39 covering the connection portion here is a non-structured section of the sealing layer 3. The connection portion 8' essentially corresponds to connection portion 8, except for layers 2 and 3 being exchanged one with the other in all functions and that the sealing layer 3 is accordingly connected to the distance layer 1 from below instead of from above. The connection portion 8' is covered by an area 29 of sealing layer 2.

FIG. 30-c thus shows two connection portions 8, 8', which each connect one of the sealing layers 2 or 3 with the distance layer 1. Given that the respective other sealing layer 3 or 2 at the connection portion is free of any interruption, an assemblage of all three layers 1, 2, 3 results which is fluid-tight in a direction transverse to the plane of the layer.

From FIG. 31, as a thirteenth example, arises an alternative possibility of interconnection for two sealing layers 2, 3 with a distance layer arranged between them. FIG. 31-a in the not yet connected state illustrates how both from below and from above, respectively, a sealing layer 2, 3 is shifted onto the head 18 of the distance layer 1; no positive fit has been established yet. Here, the sealing layers 2, 3 in the section shown extend essentially mirror symmetric with respect to each other. They each engage with a cranked section 24 into the recess 10 of the distance layer 1. In doing so, the respective cranked section 24 starting at a bending line 28 first extends as an inclined portion advantageously with an angle α of 10° to 60° to the center plane of the respective sealing layer 2, 3—which is a particular characteristic. It then continues into a straight section 27 extending parallel to this center plane. The height of the cranking, H2, H3 in this context corresponds to about half the height of the thickness H4 of the distance layer 1.

As a completion, the connected state is shown in FIG. 31-b. On both connection portions 8 and 8', thus on the upper and lower side of the head 18, this head on both sides shows a notch 15a, 15a', respectively, which causes a deformation of the area 15b, 15b' adjoining to the notch 15a, 15a' and this way shifts the outer border 12 of the head 18. As a consequence, its outer border 12 overlaps with the edge 22, 22' of the respective sealing layer 2, 3. The connection portion thus essentially corresponds to the one for dual connections of a sealing layer 2 and 3, respectively, with the distance layer 1. However, the cranked areas 27 here encounter a respective support, while comparable portions of the dual connection have no such resting surfaces.

FIG. 32 as fourteenth example shows a top view to a section of a further embodiment of a control plate 100 for a hydraulic system according to the invention in the connected state of the layers. This embodiment is different from the preceding twelfth and thirteenth embodiments as it shows a deviating shape of the recesses 20, 10 in the sealing and distance layers 2, 1 as well as by the form of the connection bridge 17 and the head 18 in the distance layer, which is in line with the aforementioned deviation. The connection bridge 17 and the head 18 here seamlessly pass over, form a bridge 23 and cannot be considered as separate parts. Other than in the preceding examples of FIG. 17ff, the combination consisting in connection bridge and head is connected with the distance layer 1 on both sides, similar to the embodiments mentioned at the beginning. The connection is free of corners and deviates from a straight form as it points outwardly with an arc which is thickened at its middle. The recess 10 in the distance layer 1 which adjoins to this on both sides here is not one piece, but is divided into two almost semilunar halves 10a, 10b by the continuous combination of connection bridge and head. In the same way, the connection portion shows two cranked sections 24 in the sealing layer 2, which both approximately describe a C-shaped arc. The angular offsets 24 here are not only radially outward, but also in the area 24', which constitutes the transition towards the combination of connection bridge and head. The combination of connection bridge and head here as an advantageous characteristic along both its borders 12 shows a notch 15a, respectively, which cause the same connection mechanism as described before. In this embodiment it is also possible to realize connections between a distance layer 1 and two or more adjacent sealing layers 2, 3 at the same portion.

In most of the preceding embodiments, a representation of any coatings has been dispensed with for the benefit of a better clarity. With respect to the coatings, one can distinguish between applications with precoated metal sheets and a coating after the metal forming. While the former results in an essentially constant coating thickness over the entire coated area, or in case of a complete coating of the entire metal sheet, in the latter case coating material collects in recesses, so that a non-regular thickness results. FIG. 33 as a fifteenth example representatively shows a partial coating 103 of a sealing layer 2 in the area of a full bead 102. It is a sealing layer 2 which has been coated after the metal forming, the coating is for instance applied by screen printing so that the thickness of the coating is particularly large in the concavity of the bead 102, while in other areas of the bead 102 and in the areas immediately continuing, it is only ascertained that the coating is sufficiently coated. The coating 103 approximately extends by half a width of a bead beyond the inflexion points of the feet of the bead 102a, 102b. A non-coated area 104 follows.

FIG. 34 as a sixteenth example shows a cross section through a connection portion of a two-layered gasket similar to the one in FIG. 5, prior to the interconnection of both layers 1 and 2. In FIG. 34, the bridge 23 is pressed through the recess 10 of layer 1, so that its outer edge 22, when viewed from the second plane 2, extends below the plane of the first layer 1. For this, the layer 2 in the area of the recess 10 is provided with crankings 24a, 24b, which starting from a knee portion 28 form an area extending under an angle α relative to the plane of layer 2, while the centered area 27 of the free edge 22 between the crankings 24a, 24b extends parallel to the plane of the layer. This centered area is situated below the first layer 1. Caulking of the border 11 of the first layer 1 allows to forming a positive fit between the centered area 27 of the bridge 23 and the first layer 1, which connects the second layer 2 with the first layer 1.

Here, it is essential, that embodiments are possible, too, in which the bridge 23 in its central area 27 does not completely extend below the layer 1, but that it may also only partially protrude beyond the plane of layer 1.

FIG. 35 as a seventeenth example shows a cross section through a connection portion of a three-layered gasket comparable to the one in FIG. 12, yet before the two layers 1 and 2 are connected to each other. In contrast to the embodiment in FIG. 12, the third sealing layer 3 in FIG. 35 in the area of the connection portion 8 shows a recess 30 with a circumferential edge 31. Due to the recess 10 of layer 1, the bridge 23 is pressed to the area of the recess 30 in layer 3, so that its outer edge 22, when viewed from the second layer 2, extends below the plane of the first layer 1. To this end, layer 2 in the area of the recess 10 is provided with crankings 24a, 24b, which, starting at a knee portion 28 form an inclined area that extends with an angle α relative to the plane of the layer 2, while the centered area 27 of the free edge 22 between the crankings 24a, 24b extends parallel to the plane of the layer. This centered area is situated slightly below the first layer 1, but within the recess 30 of the third layer 3. By caulking of the border 11 of the first layer 1, a positive fit between the centered area 27 of the bridge 23 and the first layer 1 can be produced, which connects the second layer 2 with the first layer 1.

With such a three-layered embodiment, the centered area 27 of the bridge 23 with respect to its thickness, thus orthogonal to the plane of the first layer 1 does not need to extend completely beyond below the first layer 1, neither. In further embodiments it can also extend completely below the third layer 3 with respect to its thickness.

The invention claimed is:

1. A flat gasket with at least a first and a second metallic layer, with at least the first and the second metallic layer being arranged one above the other in an at least partially covering manner and connected to each other at least one connection portion, said flat gasket comprising, in at least one of the connection portions, the first layer having a border and the second layer having at least one free edge, where a first free edge comprises a cranking wherein an offset section of said cranking extends along at least a section of the border within the layer thickness of the first layer or that the offset section of said cranking extends on a side of the first layer pointing away from the second layer partially or completely outside the layer thickness of the first layer, the border overlaps the first free edge orthogonally to the plane of the layer on the side of the offset section of said cranking pointing towards the second layer to form a positive fit which acts orthogonally to the plane of the first layer, wherein outside said connection portions said first layer has a first thickness portion and wherein at said connection portions said first layer has a second thickness portion that is thinner than said first thickness portion, wherein lugs extend obliquely from said second thickness portion.

2. The flat gasket according to claim 1, wherein at the connection portion, the second layer comprises a bridge, the outer edge of which bridge extends at least in sections as the free edge adjacent to the border.

3. The flat gasket according to claim 2, wherein the bridge has a straight, curved, round, cornered or oval shape.

4. The flat gasket according to claim 3, wherein the bridge is formed symmetric to its longitudinal axis and/or its transversal axis or the bridge is formed rotationally symmetrical about its middle.

5. The flat gasket according to claim 1, wherein there are at least three metallic layers, which at least pair-wise are arranged one on top of the other and covering each other at least in sections, with the three layers being connected by at least one of the following manners:

a) the middle layer is connected with each of its adjacent layers pair-wise each at least one of said connection portions;

b) the layers arranged adjacent to the middle layer are connected at least one of said connection portions, with the middle layer showing one passage opening in the area of the connection portions;

c) a first one of the at least three layers comprises the border and the middle layer as well as one of the layers adjacent to the middle layer each comprise a second free edge, with both the first and second free edges comprising said cranking the offset sections of said cranking extend along at least one section of the border neighboring to the border inside the layer thickness of the first layer;

d) a first, middle one of the at least three layers comprises a border and two layers adjacent to the middle layer each on one side of the latter comprise the free edge, with both free edges comprising said cranking the offset sections of said cranking at least along a section of the border extend adjacent to the border inside the layer thickness of the first layer.

6. The flat gasket according to the claim 5, wherein at least two connection portions, which interconnect different pairs of layers, are distanced from each other in the plane of the layer of at least one of the layers or are arranged one on top of the other orthogonal to the plane of the layer.

7. A flat gasket with at least a first and a second metallic layer, with at least the first and the second metallic layer being arranged one above the other in an at least partially covering manner and connected to each other at least one connection portion, said flat gasket comprising, in at least one of the connection portions, the first layer having a border and the second layer having at least one free edge, where a first free edge comprises a cranking, an offset section of said cranking extends along at least a section of the border within the layer thickness of the first layer or that the free edge comprises a cranking, the offset section of said cranking extends along a first section of the border partially within the layer thickness of the first layer and extends the edge along a second section of the border, opposite to the first section in a direction orthogonal to the plane of the layers, partially outside the layer thickness, the border overlaps the first free edge orthogonally to the plane of the layer on a side offset section of said cranking pointing towards the second layer to form a positive fit which acts orthogonally to the plane of the first layer, wherein outside said connection portions said first layer has a first thickness portion and wherein at said connection portions said first layer has a second thickness portion that is thinner than said first thickness portion, wherein lugs extend obliquely from said second thickness portion.

8. A flat gasket with at least a first and a second metallic layer, with at least the first and the second metallic layer being arranged one above the other in an at least partially covering manner and connected to each other at least one connection portion, said flat gasket comprising, in at least one of the connection portions, the first layer having a border and the second layer having at least one free edge, where a first free edge comprises a cranking, an offset section of said cranking extends along a first section of the border partially within the layer thickness of the first layer and extends along a second section of the border, opposite to the first section in a direction orthogonal to the plane of the layers, partially outside the layer thickness or the free edge is completely outside the layer thickness of the first layer, the border overlaps the first free edge orthogonally to the plane of the layer on the side of the offset section of said cranking pointing towards the second layer to form a positive fit which acts orthogonally to the plane of the first layer, wherein outside said connection portions said first layer has a first thickness portion and wherein at least one lug at said at least one connection portion is thinner than said first thickness, wherein said at least one lug extends obliquely from said at least one connection portion.

9. The flat gasket according to claim 1, wherein either at said connection portions or outside said connection portions, said first layer has a thickness that is at least twice the thickness of the second layer.

10. The flat gasket according to claim 1, wherein said obliquely extending lugs overlap said bridge.

\* \* \* \* \*